United States Patent
Kang et al.

(10) Patent No.: US 10,785,051 B2
(45) Date of Patent: *Sep. 22, 2020

(54) MOBILE TERMINAL, SERVER, AND METHOD OF OPERATING THE SAME

(71) Applicant: LG ELECTRONICS INC., Seoul (KR)

(72) Inventors: Minjung Kang, Seoul (KR); Jiyoung Kang, Seoul (KR); Jaeseon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,268

(22) Filed: Jan. 21, 2020

(65) Prior Publication Data

US 2020/0162279 A1     May 21, 2020

Related U.S. Application Data

(63) Continuation of application No. 15/872,611, filed on Jan. 16, 2018, now Pat. No. 10,587,429.

(30) Foreign Application Priority Data

Jan. 16, 2017 (KR) .......................... 10-2017-0006910

(51) Int. Cl.
*H04L 12/28* (2006.01)
*H04M 1/725* (2006.01)
(Continued)

(52) U.S. Cl.
CPC ...... *H04L 12/2818* (2013.01); *G06F 3/04817* (2013.01); *H04M 1/72533* (2013.01);
(Continued)

(58) Field of Classification Search
CPC .......... H04L 12/2818; H04L 2012/285; H04L 2012/2841; G06F 3/04817;
(Continued)

(56) References Cited

U.S. PATENT DOCUMENTS

| | | | |
|---|---|---|---|
| 2012/0019674 A1* | 1/2012 | Ohnishi | G08C 17/00 348/207.1 |
| 2012/0124676 A1* | 5/2012 | Griffin | H04L 63/0815 726/28 |

(Continued)

FOREIGN PATENT DOCUMENTS

| | | |
|---|---|---|
| EP | 2 993 832 | 3/2016 |
| KR | 10-1494854 | 2/2015 |

OTHER PUBLICATIONS

European Search Report issued in Application 18151643.6 dated Mar. 20, 2018.
(Continued)

*Primary Examiner* — Brian Wilson
(74) *Attorney, Agent, or Firm* — KED & Associates LLP

(57) ABSTRACT

A mobile terminal includes: a display; a radio communication unit configured to exchange data with a server; and a controller configured to perform various operations. For example, in response to an input to execute an application associated with a home appliance, the controller to control a screen of the application associated with the home appliance to be displayed on the display. In response to a simple login item on the screen of the application being selected, the controller to control the radio communication unit to create a simple login ID account based on device information of the mobile terminal, and to transmit data including information on the created simple login ID account to the server. Additionally, in response to an account login item on the screen of the application being selected, the controller to
(Continued)

control the radio communication unit to transmit data including user account information to the server.

20 Claims, 21 Drawing Sheets

(51) Int. Cl.
*G06F 3/0481* (2013.01)
*G05B 15/02* (2006.01)
(52) U.S. Cl.
CPC ...... *G05B 15/02* (2013.01); *G05B 2219/2642* (2013.01); *H04L 2012/285* (2013.01); *H04L 2012/2841* (2013.01)
(58) Field of Classification Search
CPC ......... H04M 1/72533; H04M 2250/06; H04M 2201/38; H04M 2201/34; G05B 2219/2642; G05B 15/02
See application file for complete search history.

(56) References Cited

U.S. PATENT DOCUMENTS

| | | |
|---|---|---|
| 2014/0106672 A1 | 4/2014 | Jeon et al. |
| 2014/0156082 A1* | 6/2014 | Ha ...................... H04L 12/2825 |
| | | 700/275 |
| 2014/0197934 A1* | 7/2014 | Ha .......................... D06F 34/28 |
| | | 340/12.5 |
| 2014/0227975 A1* | 8/2014 | Kuroyama ........... H04B 5/0031 |
| | | 455/41.1 |
| 2014/0366055 A1 | 12/2014 | Murakami |
| 2016/0173481 A1 | 6/2016 | Kwon et al. |

OTHER PUBLICATIONS

Korean Office Action issued in application 10-2017-0006910 dated Mar. 21, 2018.
U.S. Office Action issued in parent U.S. Appl. No. 15/872,611 dated Jul. 8, 2019.

\* cited by examiner

FIG. 9
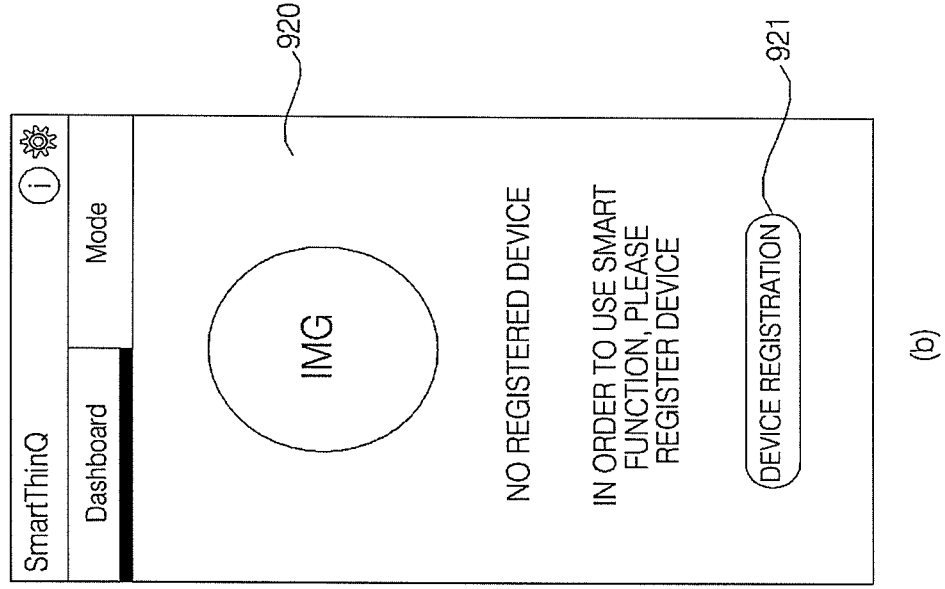
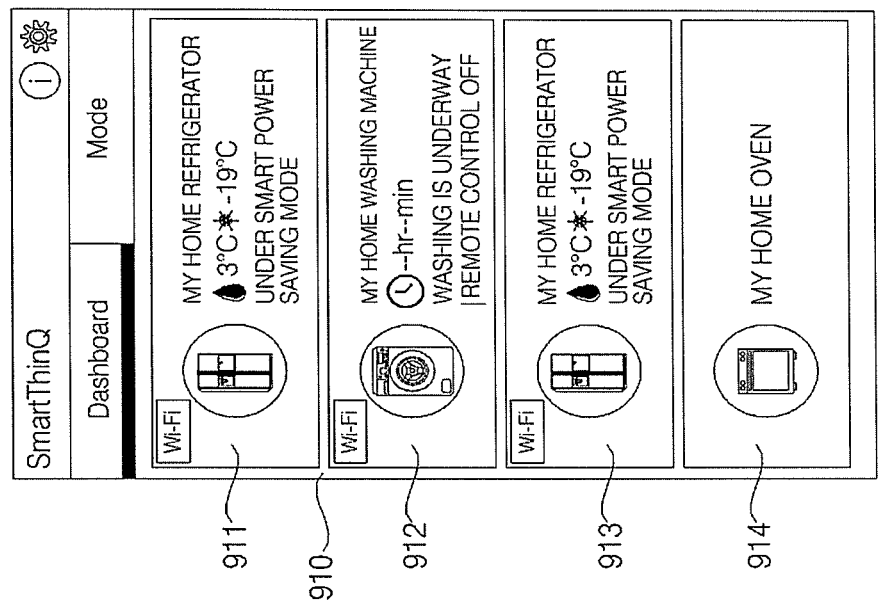

FIG. 13

| | | UUID | LG ACCOUNT |
|---|---|---|---|
| CREATE ACCOUNT | ISSUE | AUTOMATICALLY ISSUED FROM PLATFORM | DIRECTLY ISSUED THROUGH USER'S SUBSCRIPTION |
| | ACCOUNT TYPE | STRING OF CHARACTERS | EMAIL |
| | CHARACTERISTICS OF ACCOUNT | UNIQUE ACCOUNT ASSIGNED FOR EACH TERMINAL | ISSUED EMAIL ACCOUNT AVAILABLE IN ANY TERMINAL |
| | PASSWORD | X | O USER'S SETTING |
| SUBSCRIPTION | SUBSCRIPTION PROCEDURE | X | O |
| | AUTHENTICATION PROCEDURE | X | O |
| | COLLECTION OF PERSONAL INFORMATION | X | O EMAIL NAME, BIRTH OF DATE |
| | TERMS OF AGREEMENT | TERMS OF SERVICE USE | TERMS OF USE OF LG ACCOUNT, TERMS OF SERVICE USE |
| USE OF SERVICE | LOGIN | X | O |
| | LOGOUT | X | O |
| WITHDRAW | WITHDRAW FROM SERVICE | WITHDRAWAL FROM SERVICE LEADS TO DELETION OF UUID | WITHDRAWAL FROM SERVICE IS IRRELEVANT TO LG ACCOUNT |
| | WITHDRAW FROM ACCOUNT | X UUID IS NOT DELETED | O LG ACCOUNT IS DELETED |

FIG. 18

| UUID (TWO HOME APPLIANCES) | LG ACCOUNTT (ONE HOME APPLIANCE) | HOME APPLIANCES LISTED FOR LG ACCOUNT (THREE HOME APPLIANCES) |
|---|---|---|

FIG. 19

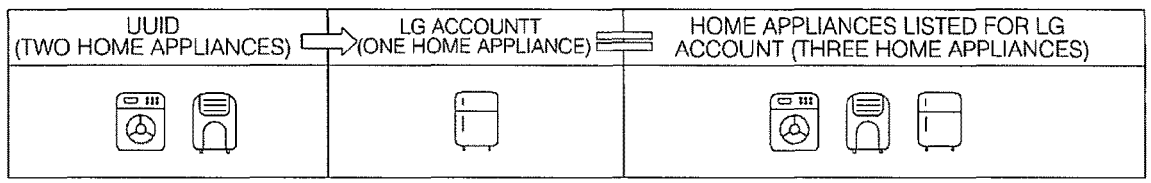

| SERVICE | NOTIFICATION RECEPTION OF UUID | NOTIFICATION RECEPTION OF LG ACCOUNT | NOTIFICATION RECEPTION OF LG ACCOUNT |
|---|---|---|---|
| AAA | ON | ON | ON |
| | | OFF | |
| | | N/A | |
| | OFF | ON | OFF |
| | | OFF | |
| | | N/A | |

FIG. 20

| HOME APPLIANCE | UUID | LG ACCOUNT | INFORMATION TO BE MAINTAINED IN LG ACCOUNT |
|---|---|---|---|
| WASHING MACHINE WASH CYCLE INFORMATION | ①GENERAL WASH CYCLE ②BLANKET WASH CYCLE ③Y-SHIRT WASH CYCLE | ①GENERAL WASH CYCLE ②BLANKET WASH CYCLE | ①GENERAL WASH CYCLE ②BLANKET WASH CYCLE ③Y-SHIRT WASH CYCLE |

FIG. 21

| HOME APPLIANCE | UUID | LG ACCOUNT | INFORMATION TO BE MAINTAINED IN LG ACCOUNT |
|---|---|---|---|
| WASHING MACHINE WASH CYCLE INFORMATION | 100 WASH CYCLES | 200 WASH CYCLES | ① A TOTAL NUMBER OF CONTENTS IS 300 BY ADDING 100 WASH CYCLES OF UUID AND 200 WASH CYCLES OF LG ACCOUNT, ② BUT ONLY 200 MOST RECENTLY STORED WASH CYCLES ARE MAINTAINED, AND ③ THE REMAINING 100 CONTENTS ARE DELETED. |

FIG. 22

| HOME APPLIANCE | UUID | ⇨ LG ACCOUNT | INFORMATION TO BE MAINTAINED IN LG ACCOUNT |
|---|---|---|---|
| OVEN RECIPE INFORMATION | ① SEA MUSTARD SOUP ② CURRY RICE ③ GIMBAP | ① SEA MUSTARD SOUP ② GIMBAP | ① SEA MUSTARD SOUP ② CURRY RICE ③ GIMBAP ④ SEA MUSTARD SOUP 2 ⑤ GIMBAP 2 |

FIG. 23

| HOME APPLIANCE | UUID | ⇨ LG ACCOUNT | INFORMATION TO BE MAINTAINED IN LG ACCOUNT |
|---|---|---|---|
| OVEN RECIPE INFORMATION | 500 OVEN RECIPES | 600 OVEN RECIPES | ① A TOTAL NUMBER OF CONTENTS IS 1100 BY ADDING 500 OVEN RECIPES OF UUID AND 600 OVEN RECIPES OF LG ACCOUNT, ② BUT ONLY 999 MOST RECENTLY STORED OVEN RECIPES ARE MAINTAINED, AND ③ THE REMAINING 101 CONTENTS ARE DELETED. |

MOBILE TERMINAL, SERVER, AND METHOD OF OPERATING THE SAME

CROSS-REFERENCE TO RELATED APPLICATIONS

This application is a Continuation Application of U.S. patent application Ser. No. 15/872,611 filed Jan. 16, 2018, which claims the priority benefit of Korean Patent Application 10-2017-0006910, filed Jan. 16, 2017 in the Korean Intellectual Property Office, the disclosures of which are incorporated herein by reference.

BACKGROUND

1. Field

The present disclosure relates to a mobile terminal, a server, and a method of operating the same. More particularly, the present disclosure relates to a mobile terminal, a server, and a method of operating the same, which provides an application service to control a plurality of home appliances.

2. Background

Existing homes appliances, such as washing machines, air-conditioners, cleaners, and the like, that are used at home or in the office, may individually perform their own functions and operations.

For example, a refrigerator stores food, a washing machine washes laundry, an air-conditioner controls indoor temperature, a cooking device cooks food, and the like.

With the development of various communication technologies, home appliances are connected to each other via network connections through wired/wireless communication.

As the home appliances are connected to each other over a network, data may be transmitted from one home appliance to another, or information on a home appliance may be checked in another home appliance.

Smart devices, such as a mobile terminal and the like, may also be connected in the network, such that a user may check and control information on the home appliances by using a smart device anytime and anywhere.

Such network of home appliances at home may be called a smart home.

Regarding the smart home technology, Korean Laid-open Patent Publication No. 10-2003-0093196 discloses a home network including a washing machine and the like.

The art discloses that, after a predetermined period of time upon completion of washing, the washing machine itself communicates with a user based on presence of laundry and humidity, and performs a follow-up process in response to a result of the communication, thereby preventing in the first place damage of laundry left in the washer for an extended period of time.

That is, upon completion of washing, the washing machine in the home network transmits information regarding the left laundry and a query message asking whether to proceed with a follow-up process, and upon receiving a response, the washing machine performs a follow-up process.

As disclosed in the art, the general smart home technology may provide services through a mobile terminal that may be carried and conveniently used by a user.

Research has been conducted on various methods to provide application services to control home appliances through a mobile terminal and to enhance user convenience.

Many methods are being developed to provide application services that allow for simple registration of home appliances based on a device or an account, and enable easy switching and integration of accounts by a user's selection.

BRIEF DESCRIPTION OF THE DRAWINGS

Arrangements and embodiments may be described in detail with reference to the following drawings in which like reference numerals refer to like elements and wherein:

FIGS. 7 to 11 are diagrams referred to in the description of an application login process according to an example embodiment of the present disclosure;

FIGS. 12 to 14 are diagrams referred to in the description of a simple login according to an example embodiment of the present disclosure; and FIGS. 15 to 25 are diagrams referred to in the description of a method of operating a mobile terminal and a server according to an example embodiment of the present disclosure.

DETAILED DESCRIPTION

Figure 1:
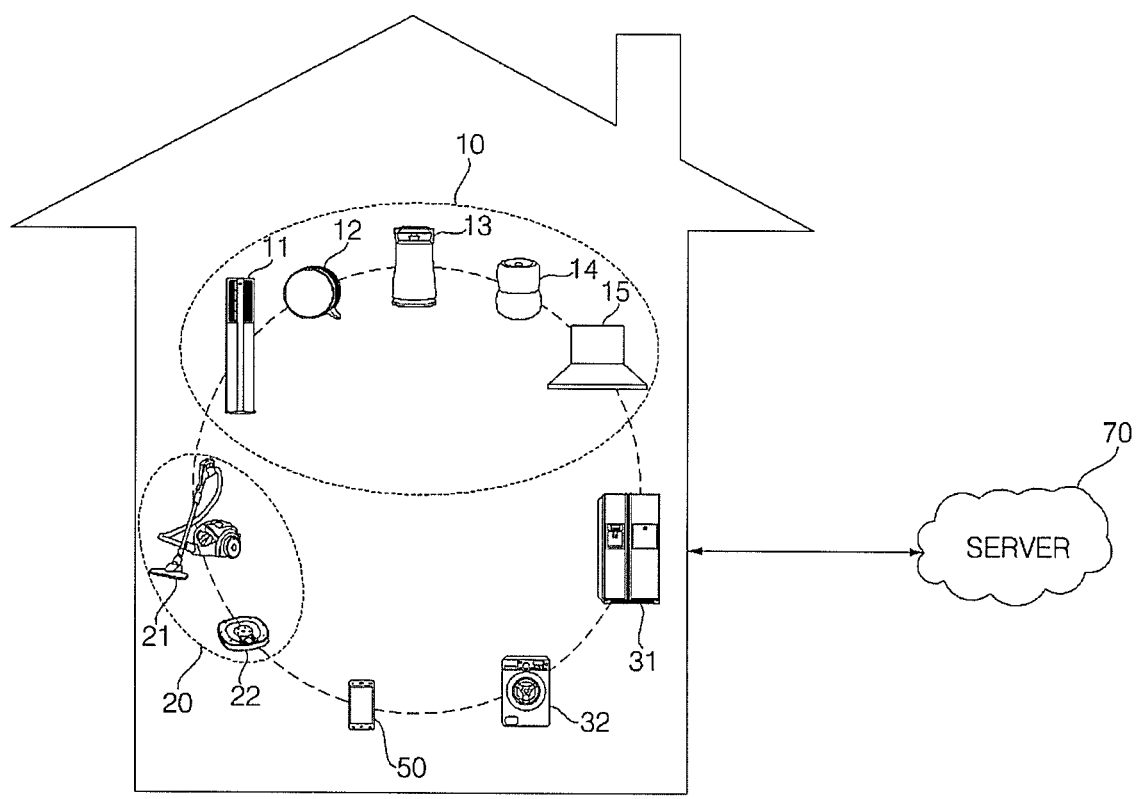
FIG. 1 is a diagram illustrating a smart home system including home appliances according to an example embodiment of the present disclosure.

Embodiments may now be described more fully with reference to the accompanying drawings, in which exemplary embodiments are shown. Embodiments may, however, be embodied in many different forms and should not be construed as being limited to the embodiments set forth herein.

In the drawings, for clarity of description, parts unrelated to description are omitted, and the same reference numerals may be used throughout this specification to refer to the same or very similar parts.

In the following description, a suffix such as "module" and "unit" may be used to refer to elements or components. Use of such a suffix herein is merely intended to facilitate description of the specification, and the suffix itself is not intended to give any special meaning or function. Thus, the terms "module" and "unit" can be used interchangeably.

FIG. 1 is a diagram illustrating a smart home system including home appliances according to an example embodiment of the present disclosure. Other embodiments and configurations may also be provided.

Referring to FIG. 1, a home appliance network system includes home appliances, each having a communication module to communicate with other devices or a server 70, or to be connected to a network.

For example, the home appliance may be an air-conditioning device 10, a cleaner 20, a refrigerator 31, a washing machine 32, and the like, each of which has a communication module (or communication device).

The air-conditioning device 10 may include at least one of the following: an air conditioner 11, an air purifiers 12 and 13, an air humidifier 14, and a hood 15.

The cleaner 20 may be (or include) a vacuum cleaner 21, a robot cleaner 22, and the like.

The communication module included in the home appliances 10, 20, 31, and 32 may be a WiFi communication module. However, there is no limitation on a communication method in the present disclosure.

The home appliances 10, 20, 31, and 32 may include another type of communication module or a plurality of communication modules. For example, the home appliances 10, 20, 31, and 32 may include a Near-Field Communication (NFC) module, a ZigBee communication module, a Bluetooth™ communication module, and the like.

The home appliances 10, 20, 31, and 32 may be connected to the server 70 through a WiFi communication module and the like, and may support smart functions such as remote monitoring, remote control, and the like.

The home appliance network system according to an example embodiment may include a mobile terminal 50 such as a smart phone, a tablet PC, and the like.

By using the mobile terminal 50, a user may check information regarding the home appliances 10, 20, 31, and 32 included in the home appliance network system, and/or may control the home appliances 10, 20, 31, and 32.

The home appliance network system may include a plurality of Internet of Things (IOT) devices. Accordingly, the home appliance network system may include the home appliances 10, 20, 31, and 32, the mobile terminal 50, and the IOT devices.

The home appliance network system may use a communication method that is not limited to a communication method for network connections.

For example, the home appliances 10, 20, 31, and 32, the mobile terminal 50, and the IOT devices may be connected to each other via network connections through a wired/wireless router.

Devices included in the home appliance network system may form a mesh topology network, in which each device is connected independently via communication connections.

The home appliances 10, 20, 31, and 32 may communicate with the server 70 or the mobile terminal 50 via a wired/wireless router. The home appliances 10, 20, 31, and 32 included in the home appliance network system may communicate with the server 70 or the mobile terminal 50 via Ethernet.

The home appliance network system may include a gateway.

The home appliances 10, 20, 31, and 32 included in the home appliance network system may be connected to each other through network connections directly or via the gateway.

The home appliances 10, 20, 31, and 32 may be connected with each other through network connections directly or via the gateway to communicate with the server 70.

In addition, the gateway may communicate with the server 70 or the mobile terminal 50 via Ethernet.

The home appliances 10, 20, 31, and 32 may transmit a device operation state, a setting value, and the like, to the server 70 and/or the gateway.

A user may check information regarding the home appliances 10, 20, 31, and 32 included in the home appliance network system, and/or may control the home appliances 10, 20, 31, and 32.

When receiving a call, the mobile terminal 50 may transmit a signal, indicating the call, to the server 70 and/or the gateway. In response to the call received by the mobile terminal 50, the home appliances 10, 20, 31, and 32 included in the home appliance network system may perform a specific operation or change a predetermined setting.

In response to a user's instruction input through the mobile terminal 50 and the like, or in response to a specific event occurring in the home appliances 10, 20, 31, and 32 included in the home appliance network system, the server 70 and/or the gateway may transmit a signal to each of the home appliances 10, 20, 31, and 32 to control the home appliances 10, 20, 31, and 32.

In some embodiments, the gateway may include an output unit, such as a display, an audio output unit, and the like.

The display and the audio output unit may be stored in the gateway, and may output an image and audio based on a received signal.

For example, a music file stored in the gateway may be reproduced and output by the audio output unit.

The display and the audio output unit may output image and audio information associated with the operation of the gateway.

The server 70 may store and manage information transmitted from the home appliances 10, 20, 31, and 32, the mobile terminal 50, and other devices.

The server 70 may be a server of home appliances or a server operated by a company entrusted by a manufacturer to provide services.

Information regarding the home appliances 10, 20, 31, and 32 may be transmitted to the mobile terminal 50, and the mobile terminal 50 may display the information received from the home appliances 10, 20, 31, and 32.

The home appliances 10, 20, 31, and 32 may receive information or an instruction from the mobile terminal 50. The home appliances 10, 20, 31, and 32 may transmit various types of information to the server 70. The server 70 may transmit some or all of the information received from the home appliances 10, 20, 31, and 32 to the mobile terminal 50.

The server 70 may transmit the information received from the home appliances 10, 20, 31, and 32 to the mobile terminal 50, while keeping the information intact or by processing the information.

While FIG. 1 illustrates an embodiment where there is a single server 70, embodiments are not limited thereto. For example, the system may be connected with two or more servers.

In some embodiments, the gateway may communicate with the server 70 or the mobile terminal 50 by using a first communication scheme; and may communicate with the IoT devices by using a second communication scheme.

For example, the first communication scheme may be a WiFi communication scheme, while the second communication scheme may be a ZigBee communication scheme.

The IoT devices may be connected to the server 70 via the gateway, and may be monitored and controlled by a user's mobile terminal 50 and the like.

Figure 2:
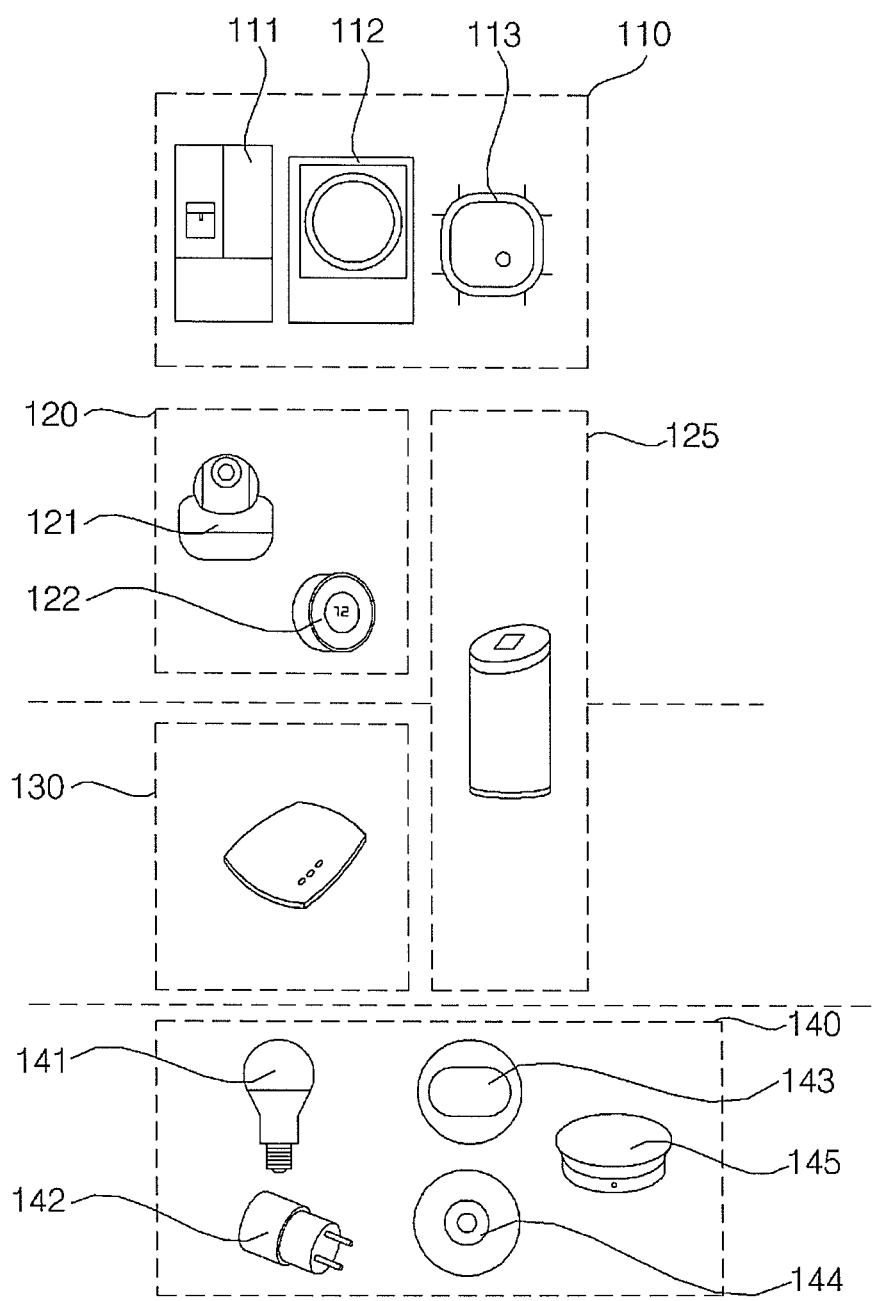
FIG. 2 is a block diagram illustrating components of a smart home and Internet of Things (IoT) system.

FIG. 2 is a block diagram illustrating components of a smart home and Internet of Things (IoT) system.

Referring to FIG. 2, the smart home and Internet of Things (IoT) system may include a smart home appliance 110 that includes a communication module to communicate with other devices or a server, and to be connected to a network.

For example, the smart home appliance 110 may be a refrigerator 111, a washing machine 112, a robot cleaner 113, an air-conditioning device, an air purifier, and the like, each of which has one or more communication modules.

The communication module included in the smart home appliance 110 may be a WiFi communication module.

Alternatively, the smart home appliance 110 may include another type of communication module or a plurality of communication modules. For example, the smart home appliance 100 may be a Near-Field Communication (NFC) module, a ZigBee communication module, a Bluetooth™ communication module, and the like.

The smart home appliance 10 may be connected to the server by using a WiFi communication module and the like, and may support smart functions such as remote monitoring, remote control, and the like.

The smart home and Internet of Things (IoT) system may include a plurality of IoT devices 120 and 140, a gateway 130, and the like.

The plurality of IoT devices 120 and 140 may be divided into the IoT device 120 that includes a WiFi communication module to be directly connected to the Internet and to the server; and the IoT accessory 140 that may be connected to the Internet and to the server via the gateway 130.

The IoT device 120 may be an IP camera 121, a thermostat 122, and the like, and may be connected to the server without passing through the gateway 130.

The IoT accessory 140 may be a smart lighting device 141, a smart plug 142, a dust sensor 143, a motion sensor 144, a multipurpose sensor 145, and the like.

The IoT accessory 140 may include a communication module to communicate with at least the gateway 130. For example, the IoT accessory 140 may include a ZigBee communication module.

The gateway 130 may communicate with the server or the mobile terminal by using a first communication scheme, and may communicate with the IoT accessory 140 by using a second communication scheme.

For example, the first communication scheme may be a WiFi communication scheme, while the second communication scheme may be a ZigBee communication scheme.

The IoT accessory 140 may be connected to the server via the gateway 130, and may be monitored and controlled by a user's mobile terminal and the like.

A user may turn on and off the smart lighting device 141 at a desired time by using a mobile terminal, and may check usage information showing the amount of power usage of the smart plug 142 and the like.

The user may check, on the mobile terminal, sensing data measured by the dust sensor 143, the motion sensor 144, the multipurpose sensor 145, and the like.

The multipurpose sensor 145 may be attached to a home appliance having no communication module. Accordingly, the home appliance, although having no communication module, may use various smart functions.

The home appliance, to which the multipurpose sensor 145 may be attached, is not limited, and may be any one or more of the following: a washing machine, a washing device, an air conditioner, a robot cleaner, and the like. Examples of the washing device may include a washing machine for washing clothes and the like, dryer for drying clothes and the like, a dish washer for washing the dishes.

The multipurpose sensor 145 may be used to add functions to a specific home appliance.

Alternatively, the multipurpose sensor 145 may be used to transmit an instruction associated with an operation to a specific home appliance.

The multipurpose sensor 145 may be used to detect surrounding conditions of the multipurpose sensor 145 regardless of the operation of the home appliance.

For example, the multipurpose sensor 145 may be attached to the home appliance, an indoor wall, a window, a door, or the like. Additionally, the IoT accessory 142, such as the smart lighting device 141, the smart plug 142, the dust sensor 143, the motion sensor 144, the multipurpose sensor 145, and the like, may further include a light emitting device to display state information. The light emitting device may include one or more light sources.

The light emitting device may display various types of information including a battery state, communication connection with an external device (server, mobile terminal, etc.), an error state, and the like. The color of light emitted by the light emitting device may vary depending on the battery state, the communication connection with the external device (server, mobile terminal, etc.), the error state, and the like.

The light emitting device may output light from a light source emitting a plurality of colors of light, and a light source emitting light of different colors corresponding to each condition.

For example, in the case where the IoT accessory 40 operates in a normal state, the light emitting device outputs blue light, and when an abnormal state occurs, the light emitting device outputs red light. Alternatively, before operating a specific operation, the light emitting device may output yellow light for a predetermined period of time so that a user may intuitively recognize that a specific operation is about to be performed.

In FIG. 2, based on presence of a communication module such as a WiFi communication module that may be connected to a server, the IoT devices 120 and 140 are divided into the IoT device 120 and the IoT accessory 140, although embodiments are not limited thereto.

For example, with reference to FIG. 1, the devices, illustrated as the IoT device 120 and the IoT accessory 140, may include other communication modules according to specifications.

A single device may perform multiple functions.

For example, a smart hub gateway 125 is a gateway that may communicate with the IoT accessory 140. Accordingly, details regarding the gateway 130 may also be applied to the smart hub gateway 125.

Additionally, the smart hub gateway 125 has a sensor function, a controlling function, and the like, such that the smart hub gateway 125 may serve as the IoT device 120.

In some embodiments, the smart hub gateway 125 may include an output unit such as a display, an audio output unit, and the like.

The display and the audio output unit may be stored in the smart hub gateway 125, and may output an image and audio based on a received signal.

For example, a music file stored in the smart hub gateway 125 may be reproduced and output by the audio output unit.

Additionally, the display and the audio output unit may output image and audio information associated with the operation of the smart hub gateway 125.

By dividing the smart home and IoT system, the IoT devices 120 and 140 and the gateway 130 may be referred to as an IoT system, and the IoT devices 120 and 140, the gateway 130, and the smart home appliance 110 may be referred to as a smart home system.

The smart home and IoT system may include the smart hub gateway 125 instead of the gateway 130, or may include both the smart hub gateway 125 and the gateway 130.

Figure 3:
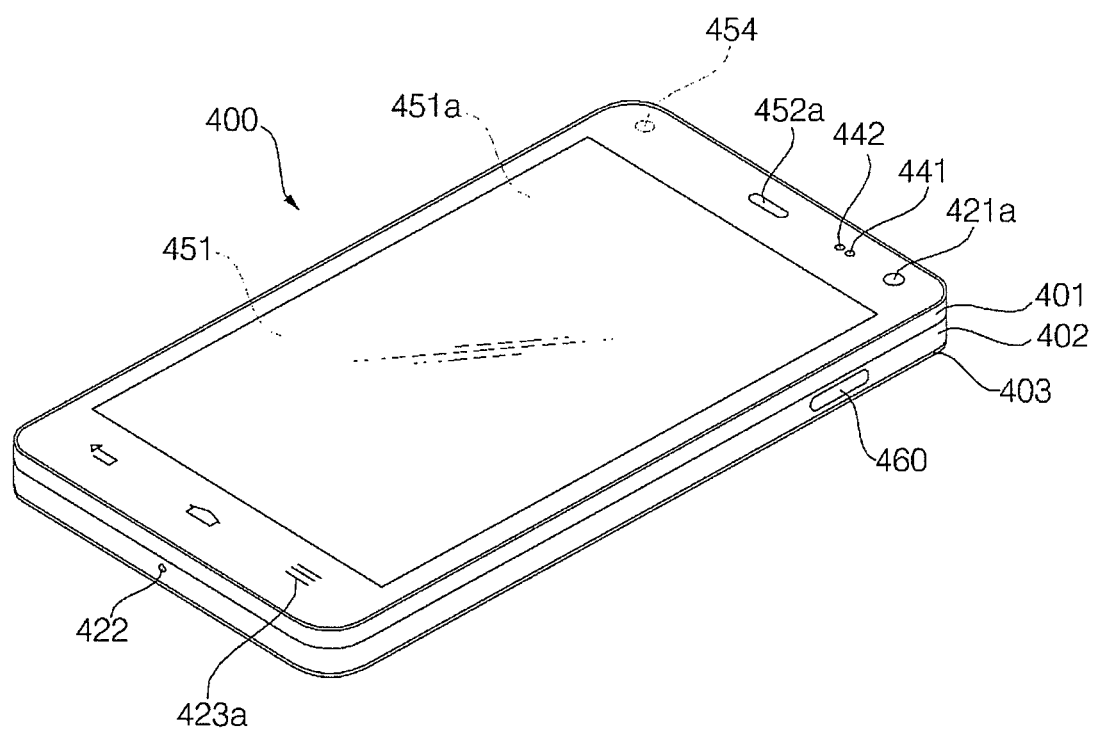
FIG. 3 is a perspective view of a mobile terminal as seen from the front side thereof according to an example embodiment of the present disclosure.

FIG. 3 is a perspective view of a mobile terminal as seen from the front side thereof according to an example embodiment of the present disclosure. Other embodiments and configurations may also be provided.

Referring to FIG. 3, the mobile terminal 50 has a bar-type terminal body. However, the embodiments are not limited thereto, but may be applicable to various structures of terminals such as watch-type, clip-type, and glasses-type, or such as folder type, flip type, slide type, swing type, swivel type, or the like, in which two or more bodies may be combined with each other in a relatively movable manner. Discussion herein will often relate to a particular type of mobile terminal. However, such teachings with regard to a particular type of mobile terminal will be generally applied to other types of mobile terminals as well.

A terminal body may be understood as a concept that refers to the mobile terminal 50 viewed as at least one assembly.

The mobile terminal 50 may include a case 400 that forms an outer appearance thereof. As illustrated in FIG. 3, the mobile terminal 50 includes a front case 401 and a rear case 402. Various electronic components may be mounted in a space formed between the front case 401 and the rear case 402. At least one intermediate case may be additionally disposed between the front case 401 and the rear case 402.

The display 451 is disposed on a front portion of the terminal body to output information. As illustrated in FIG. 3, a window 451a of the display 451 is mounted at the front case 401 to form the front portion of the terminal body along with the front case 401.

Electronic components may also be mounted at the rear case 402. Examples of the electronic component that may be mounted at the rear case 402 include a detachable battery, an identification module, a memory card, and the like. A rear cover 403, which covers the mounted electronic component, may be detachably coupled to the rear case 402. Accordingly, when the rear cover 403 is detached from the rear case 402, the electronic components mounted at the rear case 402 are exposed to the outside.

As illustrated in FIG. 3, once the rear cover 403 is coupled to the rear case 402, a side surface of the rear case 402 may be partially exposed. In some cases, upon the coupling, the rear case 402 may be completely covered by the rear cover 403. The rear cover 403 may include an opening to externally expose a camera (not shown) or an audio output unit (not shown).

The cases 401, 402, and 403 may be formed by injection-molding synthetic resin, or may be made of metal, such as stainless steel (STS), aluminum (Al), titanium (Ti), or the like.

As an alternative to the example where the plurality of cases form an inner space for accommodating components, the mobile terminal 50 may be configured such that a single case forms the inner space. In this example, the mobile terminal 50 may be formed to have a uni-body made of synthetic resin or metal extending from a side surface to a rear surface.

Additionally, the mobile terminal 50 may include a waterproof unit for preventing water from infiltrating into the terminal body. For example, the waterproof unit may include a waterproof member between the window 451a and the front case 401, between the front case 401 and the rear case 402, or between the rear case 402 and the rear cover 403, so as to seal an inner space when the cases are coupled.

The mobile terminal 50 may be provided with the display 451, a first and second sound output units 452a (not shown), a proximity sensor 441, an illumination sensor 442, a light output unit 454, the first and second cameras 421a (not shown), a first and second manipulation units 423a (not shown), a microphone 422, an interface unit 460, and the like.

As shown in FIG. 3, description may be made with reference to the mobile terminal 50, in which the display 451, the first sound output unit 452a, the proximity sensor 441, the illumination sensor 442, the light output unit 454, the first camera 421a, and the first manipulation unit 423a are disposed on the front surface of the mobile terminal 50; the second manipulation unit (not shown), the microphone 422, and the interface unit 460 are disposed on the side surface thereof; and the second sound output unit (not shown) and the second camera (not shown) are disposed on the rear surface thereof.

However, configuration of the components is not limited to the arrangement, and any of the components may be excluded or replaced if necessary, or may be disposed on another surface.

The display 451 displays (output) information processed in the mobile terminal 50. For example, the display 451 may display execution screen information of an application program executed at the mobile terminal 50, or User Interface (UI) and Graphic User Interface (GUI) information in response to the execution screen information.

The display 451 may include at least one or more of the following: a liquid crystal display (LCD), a thin film transistor-liquid crystal display (TFT-LCD), an organic light emitting diode (OLED), a flexible display, a 3-dimensional (3D) display, and an e-ink display.

The display 451 may be implemented using two or more display devices depending on an embodiment of the mobile terminal 50. In this example, a plurality of displays may be arranged on one side, where the displays may be spaced apart from each other or may be integrally disposed; or each of the displays may be disposed on different surfaces.

The display 451 may also include a touch sensor that senses a touch input to the display 451, so as to receive a control command by a touch operation. In this manner, when a touch is input to the display 451, the touch sensor senses the touch, and based on the touch input, the controller 140 generates a control command corresponding to the touch. The content input by the touch operation may be a text or numerical value, or a menu item that can be indicated or designated in various modes.

The touch sensor may be made of a film having a touch pattern, and may be disposed between the window 451a and a display (not shown) arranged on a rear surface of the window 451a; or the touch sensor may be a metal wire patterned directly on the rear surface of the window 451a. Alternatively, the touch sensor may be integrally formed with the display. For example, the touch sensor may be disposed on a substrate of the display or disposed in the display.

As described above, the display 451 may form a touch screen together with the touch sensor, in which case, the touch screen may serve as a user input unit. In some examples, the touch screen may replace at least some of the functions of the first manipulation unit 423a.

The first audio output unit 452a may be implemented as a receiver that delivers audio during a call to a user's ear, and the second audio output unit may be implemented as a loud speaker to output various alarm sounds or multimedia audio reproduction sounds, and the like.

The window 451a of the display 451 may include a sound hole to allow audio, generated by the first audio output unit 452a, to pass. However, embodiments are not limited thereto, and the audio may be released along an assembly gap between structures (for example, a gap between the window 451a and the front case 401). In this example, a hole, which is formed independently to output audio sounds, may not be seen or is otherwise hidden in terms of appearance, such that the appearance of the mobile terminal 50 may be simplified.

The light output unit 454 is configured to output light for notifying the occurrence of an event. Examples of the event include a message reception, a call signal reception, a missed call, an alarm, a schedule notice, an email reception, information reception through an application, and the like. Upon sensing that the event is checked by a user, the controller 140 may control the light output unit 454 to terminate light output.

The first camera 421a may process image frames of still or moving images obtained by an image sensor in an image capture mode or video call mode. The processed image frames may be displayed on the display 451, and may be stored in the memory.

The first and second manipulation units 423a (not shown) are an example of the user input unit 430, which is operated by a user to provide input of instructions to control the mobile terminal 50. The first and second manipulation units 423a may also be commonly referred to as a manipulating portion. The first and second manipulation units 423a may employ any tactile method that allows the user to perform manipulation such as touch, push, scroll, or the like. The first and second manipulation units 423a may also employ any non-tactile method that allows the user to perform manipulation such as proximity touch, hovering, or the like.

Although FIG. 3 illustrates the first manipulation unit 423a as a touch key, embodiments are not limited thereto. For example, the first manipulation unit 423a may be a mechanical key, a push key, a touch key, or combinations thereof. Inputs received by the first and second manipulation units 423a may be set in various manners. For example, the first manipulation unit 423a may be used to provide an input of instructions, such as a menu, home key, cancel, search, or the like, and the second manipulation unit may be used to provide an input of instructions to control a volume level being output from the first or second audio output units 452a (not shown), or to switch to a touch recognition mode of the display 451, or the like.

As another example of the user input unit, a rear input unit (not shown) may be positioned on the rear surface of the terminal body. The rear input unit may be operated by a user to provide input to the mobile terminal 50. The input details may be set in various manners. For example, the rear input unit may be used by the user to provide an input for power on/off, start, end, scroll, control volume level being output from the first or second audio output units 452a (not shown), switch to a touch recognition mode of the display 451, and the like. The rear input unit may be configured to allow touch input, a push input, or combinations thereof.

The rear input unit may be disposed to overlap the display 451 on the front side in a thickness direction of the terminal body. For example, the rear input unit may be disposed on an upper end portion of the rear side of the terminal body, so that a user may easily operate the rear input unit with a forefinger while holding the terminal body in one hand. However, embodiments are not necessarily limited thereto, and the position of the rear input unit may be changed.

As described above, in the example where an input unit is provided on the rear surface of the terminal body, a new user interface using the input unit may be implemented. Further, the above-described touch screen or rear input unit may perform at least some of the functions of the first manipulation unit 423a provided on the front surface of the terminal body, such that in the case where the first manipulation unit 423a is not provided on the front surface of the terminal body, the display 451 may have a larger screen.

The mobile terminal 50 may have a finger scan sensor to recognize a user's fingerprint, and the controller 480 may use fingerprint information, sensed by the finger scan sensor, as part of an authentication procedure. The finger scan sensor may also be mounted in the display 451 or in the user input unit.

The microphone 422 is configured to receive input of a user's voice, other sounds, and the like. The microphone 422 may be provided at a plurality of positions to receive input of stereo sounds.

The interface unit 460 (or interface) may serve as a path to allow the mobile terminal 50 to interface with external devices. For example, the interface unit 460 may include one or more of a connection terminal for connection to another device (e.g., an earphone, an external speaker, etc.), a port for near field communication (e.g., an Infrared Data Association (IrDA) Port, a Bluetooth port, a wireless LAN port, etc.), or a power supply terminal for supplying power to the mobile terminal 50. The interface unit 460 may be implemented in the form of a socket for accommodating an external card, such as Subscriber Identification Module (SIM), User Identify Module (UIM), or a memory card for information storage.

The second camera may be disposed on the rear surface of the terminal body, in which case, the second camera has an image capturing direction substantially opposite to the image capturing direction of the first camera unit 421a (or first camera).

The second camera may include a plurality of lenses arranged along at least one line. The plurality lenses may be arranged in a matrix. The cameras may be referred to as an "array camera." In the example where the second camera is implemented as an array camera, the camera may capture images in various manners using the plurality of lenses, in which the captured images may be of better qualities.

A flash may be disposed adjacent to the second camera. When the second camera captures a subject, the flash emits light toward the subject.

The second audio output unit may be additionally disposed at the terminal body. The second audio output unit may implement stereophonic sound functions in conjunction with the first audio output unit 452a, and may also be used to implement a speaker phone mode during a call.

At least one antenna for wireless communication may be provided at the terminal body. The antenna may be mounted in the terminal body or may be provided at the case. For example, an antenna, which is included as part of a broadcast reception module 411 (FIG. 4), may be retractable into the terminal body. Alternatively, an antenna may be formed of a film type to be attached to the inner side of a rear cover 403, or a case including a conductive material may function as an antenna.

A power supply 490 (FIG. 4) to supply power to the mobile terminal 50 may be provided at the terminal body. The power supply 490 may include a battery (not shown), which is mounted in the terminal body or detachably coupled to an outside of the terminal body.

The battery may be supplied with power via a power source cable connected to the interface unit 460. Further, the battery may be recharged in a wireless manner using a wireless charger. Wireless charging may be performed by magnetic induction or electromagnetic resonance.

In the drawing, the rear cover 403 is coupled to the rear case 402 to cover the battery 191, thereby preventing separating of the battery 191 and protecting the battery 191 from an external impact or foreign material. In the case where the battery 191 is detachable from the terminal body, the rear cover 403 may be detachably coupled to the rear case 402.

An accessory for protecting an outer appearance of the mobile terminal 50, or for assisting or extending functions of the mobile terminal 50, may be further provided for the mobile terminal 50. As an example of the accessory, a cover or pouch may be used to cover or accommodate at least one surface of the mobile terminal 50. The cover or pouch may cooperate with the display 451 to extend functions of the mobile terminal 50. As another example of the accessory, a touch pen may be used to assist or extend a touch input to a touch screen.

Besides a mobile terminal which is used while being held in a user's hand, the mobile terminal may be implemented as a wearable device that can be worn on the human body. Examples of the wearable device include a smart watch, a smart glass, a head mounted display (HMD), and the like. Hereinafter, examples of the mobile terminal, of which use is extended to the wearable device, will be described below.

The wearable device may exchange data with (or cooperate with) another mobile terminal 50. A short-range communication module 417 may detect (or identify) a wearable device which is located nearby to communicate with the mobile terminal 50. When the detected wearable device is a device which has been authenticated to communicate with the mobile terminal 50, the controller 480 may transmit at least a portion of data, processed in the mobile terminal 50, to the wearable device via the short-range communication module 417. Accordingly, a user may use the data processed in the mobile terminal 50 by using the wearable device. For example, when a call is received in the mobile terminal 50, the user may answer the call by using the wearable device, and when a message is received in the mobile terminal 50, the user may check the received message by using the wearable device.

Figure 4:
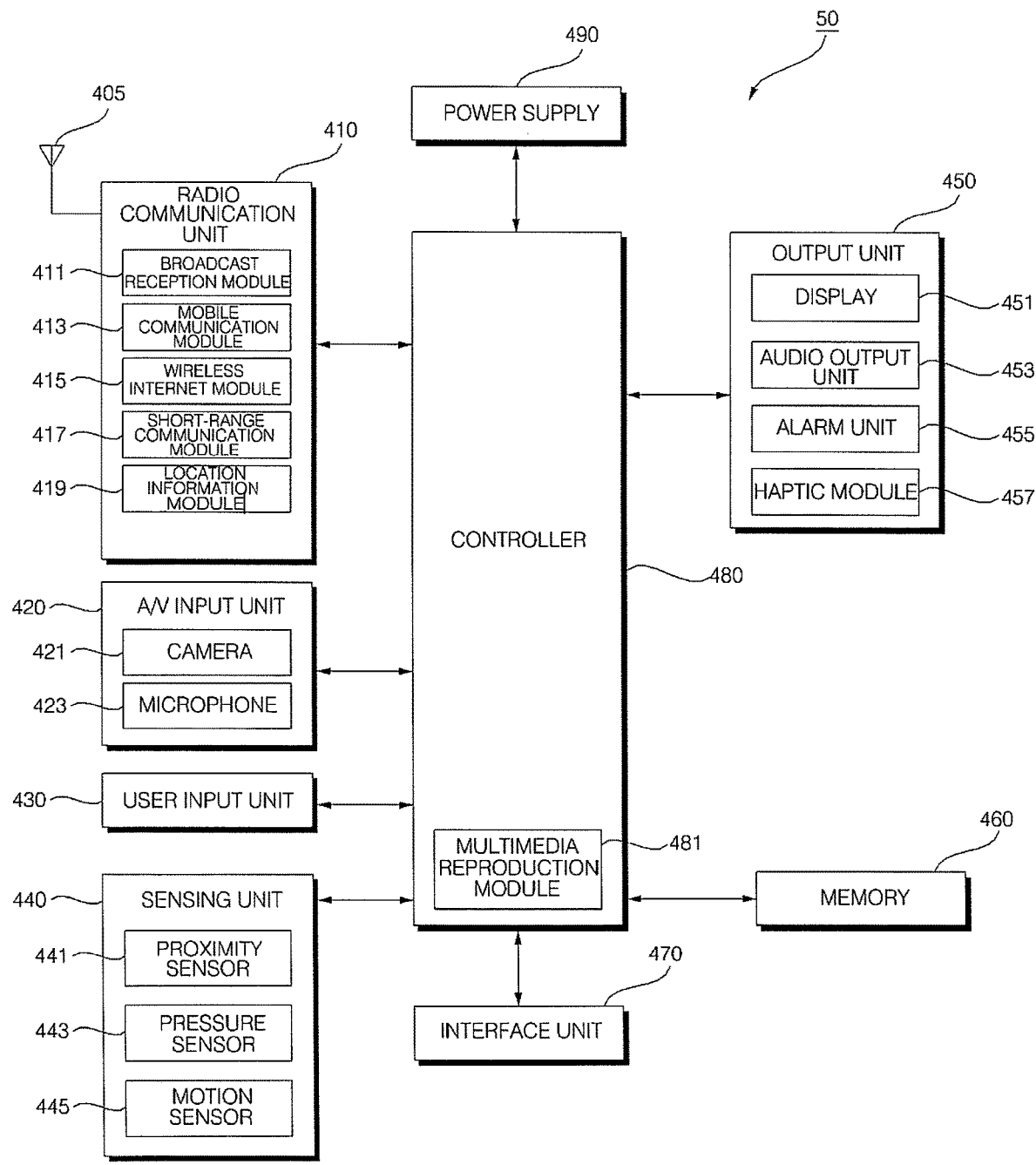
FIG. 4 is a schematic block diagram illustrating an internal configuration of a mobile terminal according to an example embodiment of the present disclosure.

FIG. 4 is a schematic block diagram illustrating an internal configuration of a mobile terminal according to an example embodiment of the present disclosure. Other embodiments and configurations may also be provided.

Referring to FIG. 4, the mobile terminal 50 includes a radio communication unit 410, an audio/video (A/V) unit 420, a user input unit 430, a sensing unit 440, an output unit 450, a memory 460, an interface unit 470, a controller 480, and a power supply unit 490.

In the exemplary embodiment, the mobile terminal 50 includes a display 451, a radio communication unit 510, and the controller 480, which is configured to, in response to an input to execute an application associated with a home appliance, control a screen of the application associated with the home appliance to be displayed on the display 451, in response to a simple login item on the screen of the application being selected, create a simple login ID account based on device information of the mobile terminal 50, and control the radio communication unit 410 to transmit data including information on the created simple login ID account to the server 70, and in response to an account login item on the screen of the application being selected, control the radio communication unit 410 to transmit data including user account information to the server 70.

The radio communication unit 410 may include a broadcast reception module 411, a mobile communication module 413, a wireless Internet module 415, a short-range communication module 417, a global positioning system (GPS) 419, and the like.

The broadcast reception module 411 receives at least one of a broadcast signal and broadcast related information from an external broadcast management server through a broadcast channel. The broadcast channel may include a satellite channel, a terrestrial channel, and the like.

The broadcast signal and/or broadcast related information received by the broadcast reception module 411 may be stored in the memory 460.

The mobile communication module 413 transmits and receives a radio signal to and from at least one of a base station, an external terminal, and a server on a mobile communication network. Here, the radio signal may include various types of data based on transmission and reception of a voice call signal, a video call signal, or text/multimedia messages.

The wireless Internet module 415 may be referred to a module for wireless Internet access, and may be included inside or outside of the mobile terminal 50. For example, the wireless Internet module 415 may perform WiFi based wireless communication or WiFi Direct based wireless communication.

The short-range communication module 417 may be referred to a module for short-range communication. The short-range communication technology may use at least one of Bluetooth, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, Wireless USB (Wireless Universal Serial Bus), and the like.

Via wireless area networks, the short-range communication module 417 supports wireless communications between the mobile terminal 50 and a wireless communication system, communications between the mobile terminal 50 and another mobile terminal 50, or communications between the mobile terminal and a network where an external server is located. One example of the wireless area networks is a wireless personal area networks.

The GPS module or location information module 419 receives positional information from a plurality of GPS satellites.

The radio communication unit 410 may exchange data with the server 70 by using one or more communication modules.

The radio communication unit 410 may include an antenna 405 for wireless communication, and in addition to an antenna for phone communication, the radio communication unit 410 may include an antenna for receiving a broadcast signal.

The A/V input unit 420 may be used to input an audio signal or a video signal, and may include a camera 121, a microphone 123, and the like.

The user input unit 430 generates key input data, which is input by a user to control the operation of a terminal. To this end, the user input unit 430 may include a key pad, a dome switch, a touch pad (static pressure/electrostatic), and the like. Particularly, in the case where a touchpad and the display 180 are layered, the touchpad and the display 180, which are layered, may be referred to as a touchscreen.

The sensing unit 440 detects a current state of the mobile terminal 50, the current state including an opening or closing state of the mobile terminal 50, a position of the mobile terminal 50, and information on whether a user contacts the mobile terminal 50, and the like, to generate a sensing signal to control an operation of the mobile terminal 50.

The sensing unit 440 may include a sensor 441, a pressure sensor 443, a motion sensor 445, and the like. The motion sensor 445 may detect a movement or a position of the mobile terminal 50 by using an accelerometer, a gyro sensor, a G-sensor (Gravity sensor), or the like. Particularly, the gyro sensor is a sensor that measures an angular velocity, and may detect a direction which has been rotated with respect to a reference direction (angle).

The output unit 450 includes the display 451, an audio output module 453, a haptic module 457, and the like.

The display 451 displays and outputs information processed in the mobile terminal 50.

In the case where the display 451 and a touchpad are layered to form a touchscreen, the display 451 may be used not only as an output device but also as an input device, via which a user may input information by a user's touch action.

The audio output module 453 outputs audio data received from the radio communication unit 410 or stored in the memory 460. Examples of the audio output module 453 include a speaker, a buzzer, and the like.

The alarm unit 455 outputs a signal to notify the occurrence of an event of the mobile terminal 50. For example, the alarm unit 455 may output the signal in the form of a vibration.

The haptic module 457 generates various tactile effects felt by a user. A typical example of the tactile effects generated by the haptic module 457 is vibration.

The memory 460 may store software programs for processing and controlling the controller 480, or may temporarily store data (for example, a phonebook, messages, still images, videos, etc.) which are input or output.

The interface unit 470 performs a function of interfacing with all the external devices connected to the mobile terminal 50. The interface unit 470 may receive data or power from such external device and may transmit the received data or power to each component in the mobile terminal 50, or may allow data in the mobile terminal 50 to be transmitted to the external device.

The controller 480 generally controls the operation of each component, and controls the overall operation of the mobile terminal 50. For example, the controller 480 may control and process an operation associated with a voice call, data communication, a video call, and the like. In addition, the controller 480 may further include a multimedia reproduction module 481 for reproducing multimedia contents. The multimedia reproduction module 481 may be provided as hardware in the controller 480 or may be provided as software separately from the controller 480.

The power supply 490 receives external and internal power by the control of the controller 480 and supplies power required for the operation of each component.

The block diagram of the mobile terminal 50 illustrated in FIG. 4 is only illustrative. Each component of the block diagram may be integrated, added, or omitted according to the specification of the mobile terminal 50 to be actually implemented.

That is, two or more components may be combined into a single component, or a single component may be divided into two or more components as needed. In addition, the function performed by each block is intended for description of the present embodiment, and the detailed operation or device thereof does not limit the scope of the present invention.

Figure 5:
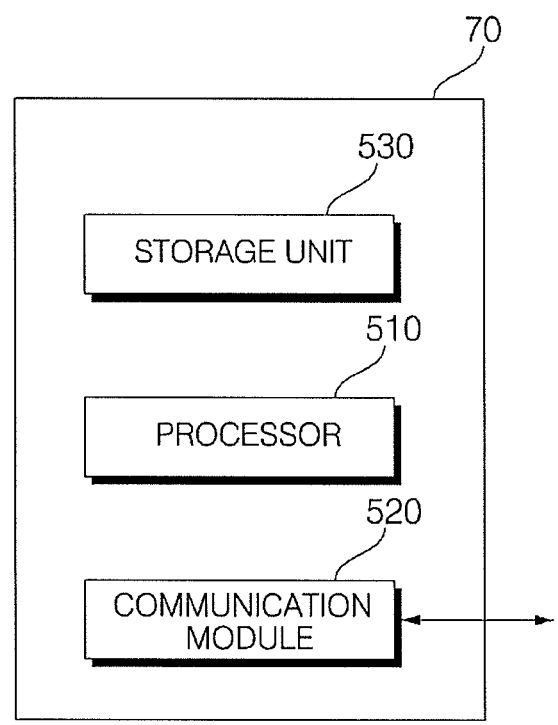
FIG. 5 is a schematic block diagram illustrating an internal configuration of a server according to an example embodiment of the present disclosure.

FIG. 5 is a schematic block diagram illustrating an internal configuration of a server according to an example embodiment of the present disclosure. Other embodiments and configurations may also be provided.

Referring to FIG. 5, the server 70 includes a communication module 520, a storage unit 530, and a processor 510.

The server 70 includes: the communication module 520 configured to exchange data with the mobile terminal 50; the storage unit 530 configured to store data to provide an application service associated with a home appliance; and the processor 510 configured to control the communication module 520 to perform a login operation based on data, including simple login ID information received from the mobile terminal 50, or based on user account information, and to transmit a control signal, which is received from the mobile terminal 50, and based on which a home appliance is controlled, to the home appliance to be controlled.

The communication module 520 may receive, from the mobile terminal, home appliance, gateway, and the like, various types of information regarding a home appliance network system. The communication module 520 may transmit result information, corresponding to the received information, to the mobile terminal, home appliance, gateway, and the like.

The communication module 520 may include one or more communication modules of an Internet module, a mobile communication module, and the like.

The communication module 520 may exchange data with the mobile terminal by using one or more communication modules.

The storage unit 530 stores the received information regarding the home appliance network system, and may include data to generate result information corresponding to the information regarding the home appliance network system.

For example, in the example where the information regarding the home appliance network system is product information of a mobile terminal or a home appliance, the storage unit 530 may store the received product information for registration of the home appliance.

In the example where the information regarding the home appliance network system is operation state information or setting value information of a mobile terminal or a home appliance, the storage unit 530 may store and manage the operation state information or the setting value information of the mobile terminal or the home appliance for each device.

The processor 510 may control the overall operation of the server 70.

Upon receiving the information regarding the home appliance network system from the mobile terminal, the processor 510 may control result information to be generated corresponding to the received information regarding the home appliance network system. The processor 510 may control the generated result information to be transmitted to the mobile terminal.

The server 70 may be a server operated by a manufacturer of a home appliance or IoT device, or may be a server operated by an operator of an application store.

Figure 6:
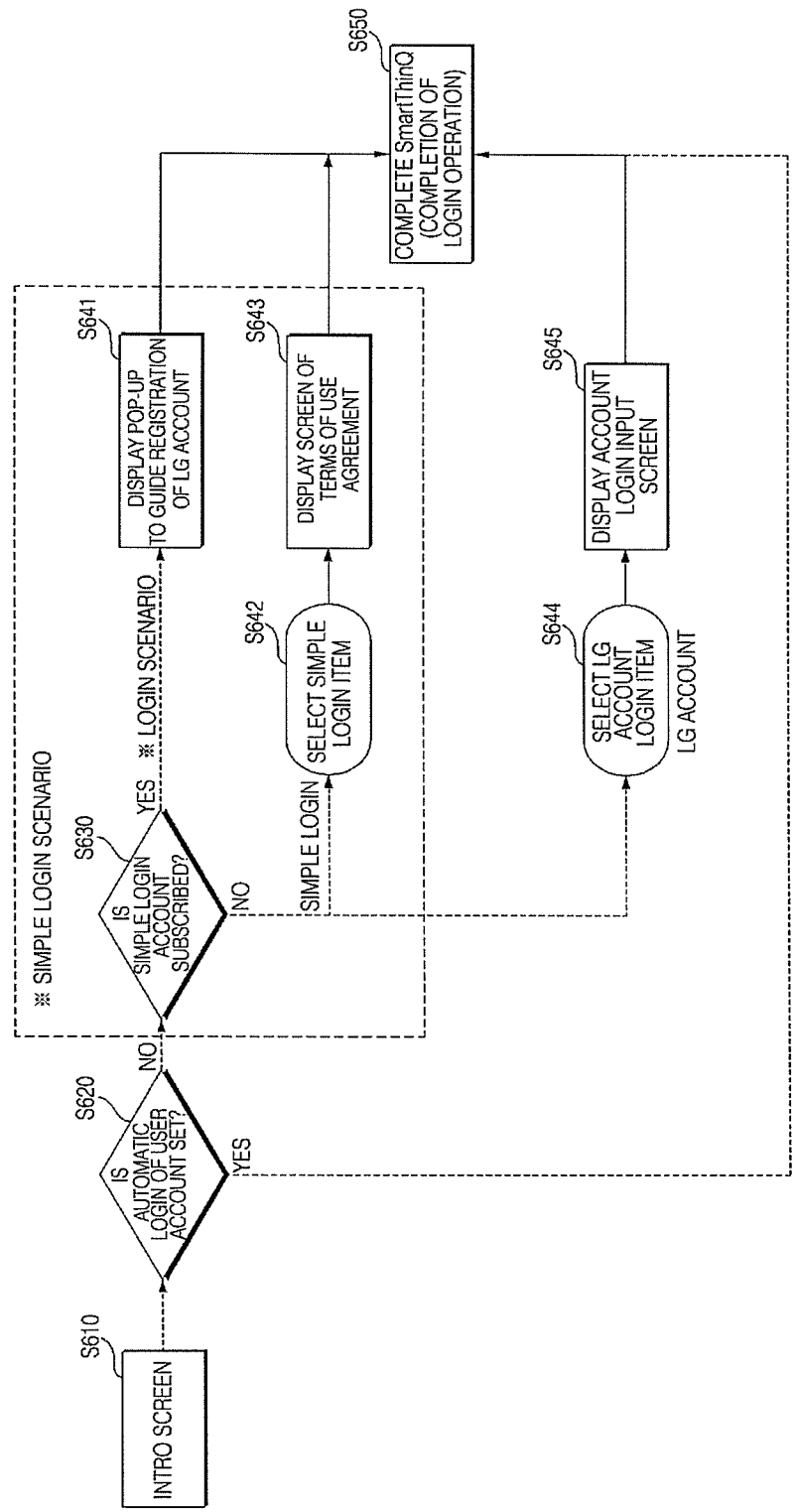
FIG. 6 is a diagram illustrating an application login scenario according to an example embodiment of the present disclosure.

FIG. 6 is a diagram illustrating an application login scenario according to an example embodiment of the present disclosure. Other embodiments and configurations may also be provided.

In the example where an application associated with a home appliance is selected from items displayed on a screen of the display 451 (of the mobile terminal 50), the application associated with the home appliance is executed, and a screen of the application associated with the home appliance may be displayed on the display 451 in S610.

In response to an input to execute the application associated with the home appliance, the controller 480 (of the mobile terminal 50) may control the screen of the application associated with the home appliance to be displayed on the display 451.

For example, the screen of the application associated with the home appliance, which is displayed in response to the input to execute the application, may be an intro screen.

The screen of the application associated with the home appliance may be a login screen including a plurality of login items.

A login screen, a loading screen for executing an application, a welcome screen, or a set of successive screens displayed from the time after the application is executed to the time until the login screen is displayed, may be referred to as the intro screen.

The login screen may include: a simple login item for login using a simple login ID account based on device information of the mobile terminal 50; and an account login item for login using a user account created corresponding to a user.

In the example where an automatic login of a user account is set in S620 when an application is executed, the controller 480 performs the automatic login to complete a login operation, and may control the display 451 to display a home screen in S650.

By contrast, in the example where the automatic login of a user account is not set in S620 when an application is executed, the controller 480 may determine whether a simple login account is subscribed in S630.

The simple login has no membership account, which requires registration of an ID and a password, and thus is different from a general login.

Accordingly, the simple login operation may refer to a process from the time when a simple login ID account, created based on device information of the mobile terminal, and a user session are issued to the time when an application is prepared for use. Further, the completion of the simple login operation may refer to completion of preparing the application for use.

Upon completing the simple login process, the home screen of the application may be displayed on the display 451.

In some embodiments, once the simple login account is subscribed through the mobile terminal 50, the simple login operation may be performed immediately without the need for a user to select the simple login item or without the need to display a login screen.

In this example, the controller 480 (of the mobile terminal 50) may control a pop-up, which guides registration of a user account to use an account login service, to be displayed on the display 451 in S641.

The display of the pop-up may end automatically after lapse of a predetermined period of time, or may be ended by a user's operation.

The controller may perform the simple login operation to complete the login, and may control a home screen to be displayed on the display 451.

In the example where a user selects the simple login item displayed on a login screen in S642, the controller 480 may control a screen of a terms of use agreement to be displayed on the display 451 in S643.

The simple login does not require an ID, password, and other personal information to be input by a user, but minimum information may be required for transmission of device information and for future registration and use of home appliances. Accordingly, as minimum terms of agreement may be required for providing a service, there is a need for a user's agreement to the terms of use.

Once the user agrees to the terms of use, the controller 480 performs a simple login operation and completes the login process without requiring any input from the user, and the controller 480 may control the home screen to be displayed on the display 451 in S650.

In this example, the controller 480 may create a simple login ID account based on device information of the mobile terminal, and may transmit data (including information on the created simple login ID account) to the server 70.

Further, upon receiving an account and user session, corresponding to a simple login ID account issued by the server 70, through the radio communication unit 410, the controller 480 my control the home screen to be displayed on the display 451 in S650.

The account, corresponding to the simple login ID account issued by the server 70, may be the same account as the simple login ID account received by the server 70 from the mobile terminal 50, or may be a new ID account issued corresponding to the simple login ID account received by the server 70 from the mobile terminal 50.

In the example where a user selects the account login item displayed on a login screen in S644, the controller 480 may control an account login input screen to be displayed on the display 451 in S645.

Once a user inputs an ID and a password (PW) on the account login input screen, the controller 480 may transmit data, including information on the input user account, to the server 70 for login of the user account.

In the example where an automatic login of a user account is set, the controller 480 may transmit data (including information on a registered user account) to the server 70 according to execution of an application, so that the user account may be logged in.

Upon completing the login process, the controller 480 may control the home screen to be displayed on the display 451.

FIGS. 7 to 11 are diagrams referred to in the description of an application login process according to an example embodiment of the present disclosure. Other embodiments and configurations may also be provided.

Figure 7:
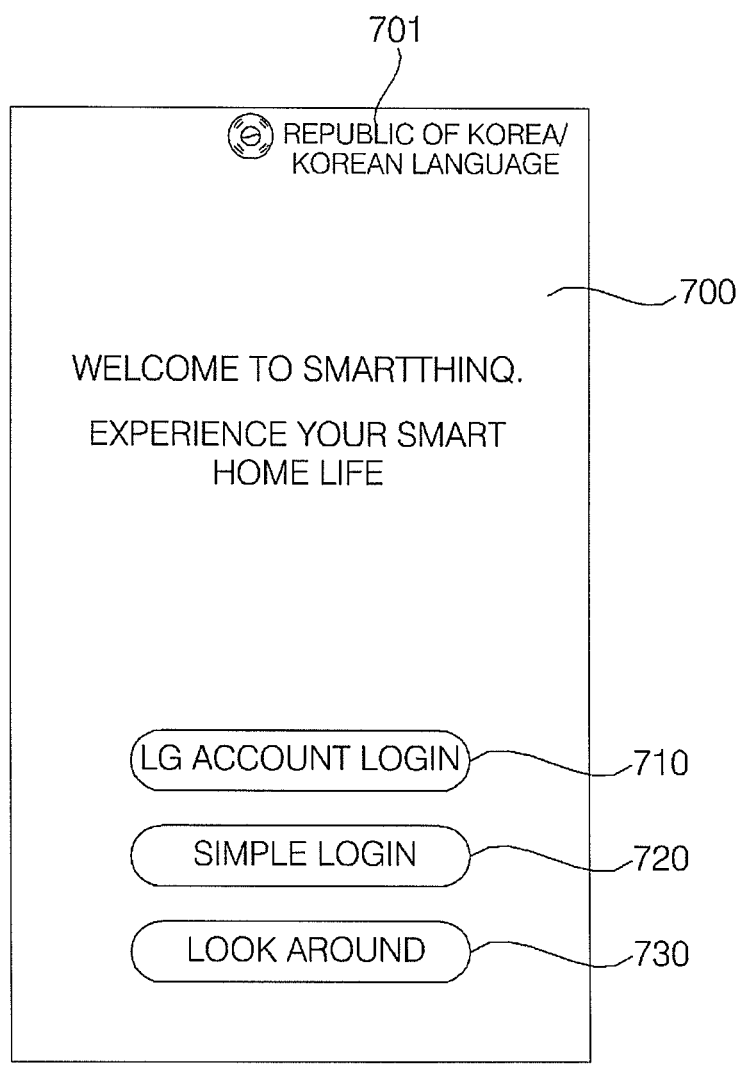

FIG. 7 is a diagram illustrating an application screen, and more specifically a login screen 700 that includes an account login item 710 and a simple login item 720.

Referring to FIG. 7, the login screen 710 may include a welcome message, such as "Welcome to SmartThinQ. Experience your smart home life", so as to welcome execution of a user's application or use of service, and the screen may also be referred to as a welcome screen.

The login screen 710 may also include a country and language setting item 701. A user may check a current setting in the country and language setting item 701, and may change the setting by selecting the country and language setting item 701.

The login screen 710 may include a look-around item 730, in which a service provided by an application may be identified, or help and video guide may be provided.

Once the simple login item 720 (included in the login screen 700) is selected, the controller 480 may create a simple login ID account based on device information of the mobile terminal 50, and may control data, including information on the created simple login ID account, to be transmitted to the server 70.

Figure 8:
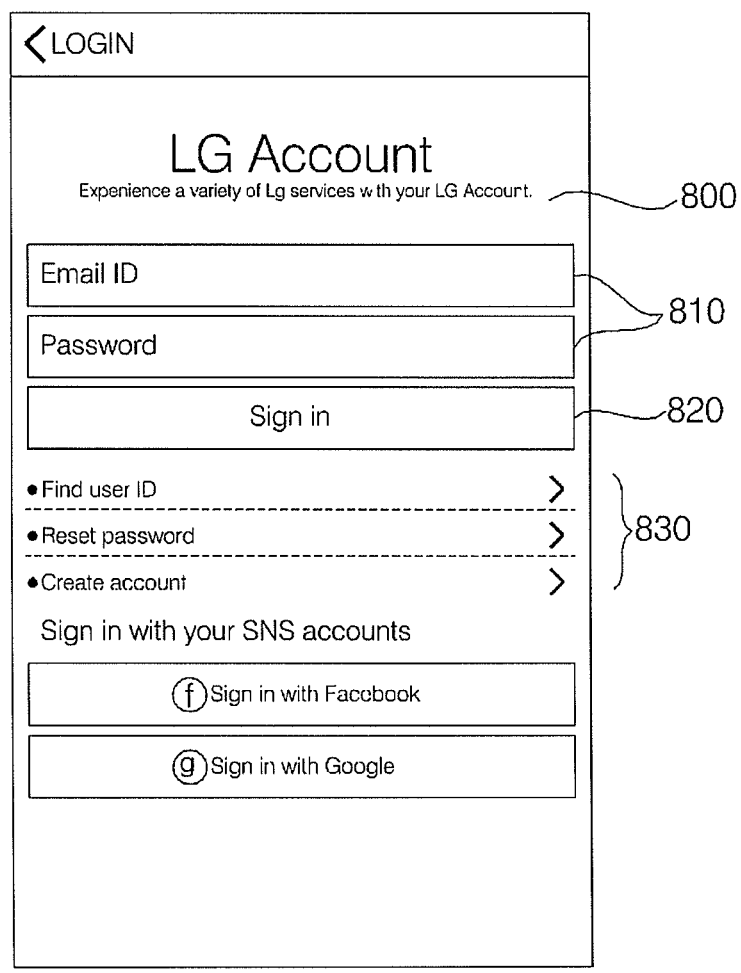

Once a user selects the account login item 710 by clicking on a tab, the controller 480 may control switching (or changing) to an account login screen 800, on which the user may input user account information including an ID and a password, as shown in FIG. 8.

In this example, once the user inputs the user account information on the account login screen 800, the controller 480 may control the radio communication unit 410 to transmit data, including the user account information, to the server 70.

Alternatively in the case where a login process is performed by recognizing a user using a user recognition method (such as fingerprint recognition, iris recognition, or the like) when the user selects the account login item 710, the controller 480 may control the radio communication unit 410 to transmit data, including the user account information, to the server 70 without switching (or changing) to the account login screen 800.

Referring to FIG. 8, the account login screen 800 may include an ID/password input window 810, a login item 820, other account related menu item 830, and the like.

After inputting an ID/password on the ID/password screen 810, the user may select the login item 820 for login of an account.

FIG. 9 illustrates a home screen displayed on the display 451 after completion of the user login, in which (a) of FIG. 9 illustrates a home screen 910 displayed when there are registered devices, while (b) of FIG. 9 illustrates a home screen 920 displayed when there is no registered device.

Referring to (a) of FIG. 9, the home screen 910 includes information 911, 912, 913, and 914 regarding registered devices. The registered devices may be home appliances, IoT devices, gateways, and the like, which are registered by a user to the account.

The information 911, 912, 913, and 914 regarding registered devices may include names of the devices, current state information, operation mode information, and the like.

Referring to (b) of FIG. 9, upon completion of the account login, when there is no device registered to the account, a user is informed that there is no registered device, and the home screen 920 may be displayed, which includes a device registration item 921 for registering a specific device.

In the example where the user selects the simple login item 720 displayed on the login screen 700, the controller 480 may control a screen of terms of use agreement to be displayed on the display 451.

Figure 10:
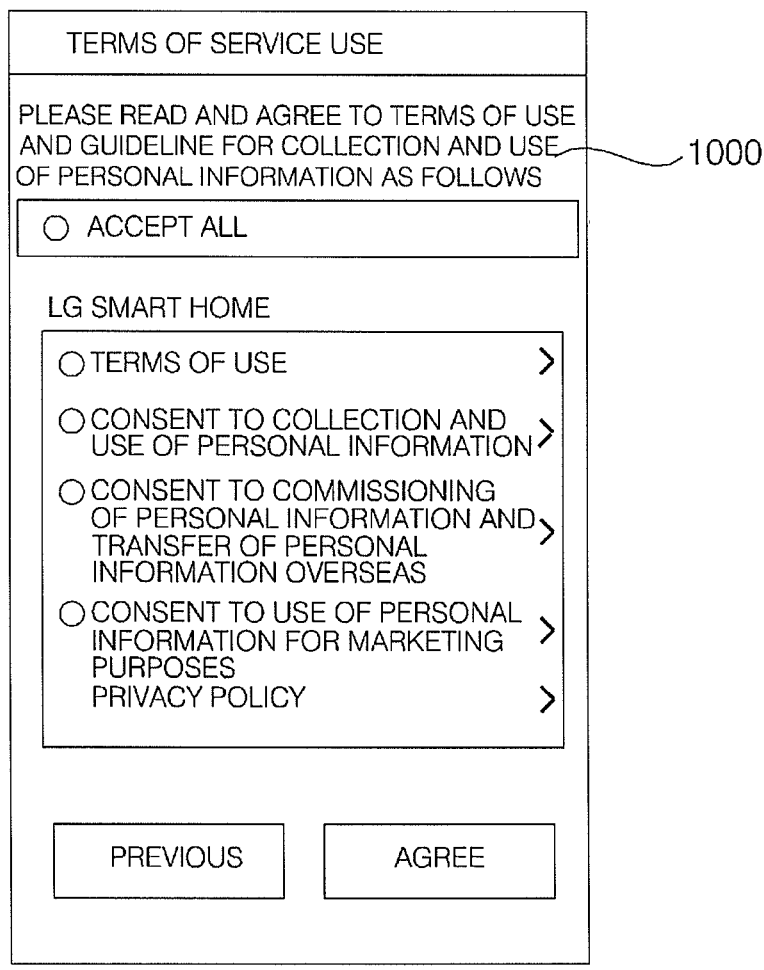

FIG. 10 illustrates an example of a screen 1000 of terms of service use agreement.

The simple login does not require an ID, password, and/or other personal information to be input by a user, but minimum information may be required for transmission of device information and for future registration and use of home appliances. Accordingly, as minimum terms of agreement may be required for providing a service, there may be a need for a user's agreement to the terms of use.

Once the user agrees to the terms of use, the controller 480 performs a simple login operation and completes the login process without requiring any input from the user, and may control the home screens 910 and 920 to be displayed on the display 451.

The home screen shown in FIG. 9 may be applied to both the account login using a user account and the simple login using device information of the mobile terminal.

In the example of the account login, however, there may be a difference in that after login of the account is performed on a device other than the mobile terminal, information on the registered device is further provided.

Figure 11:
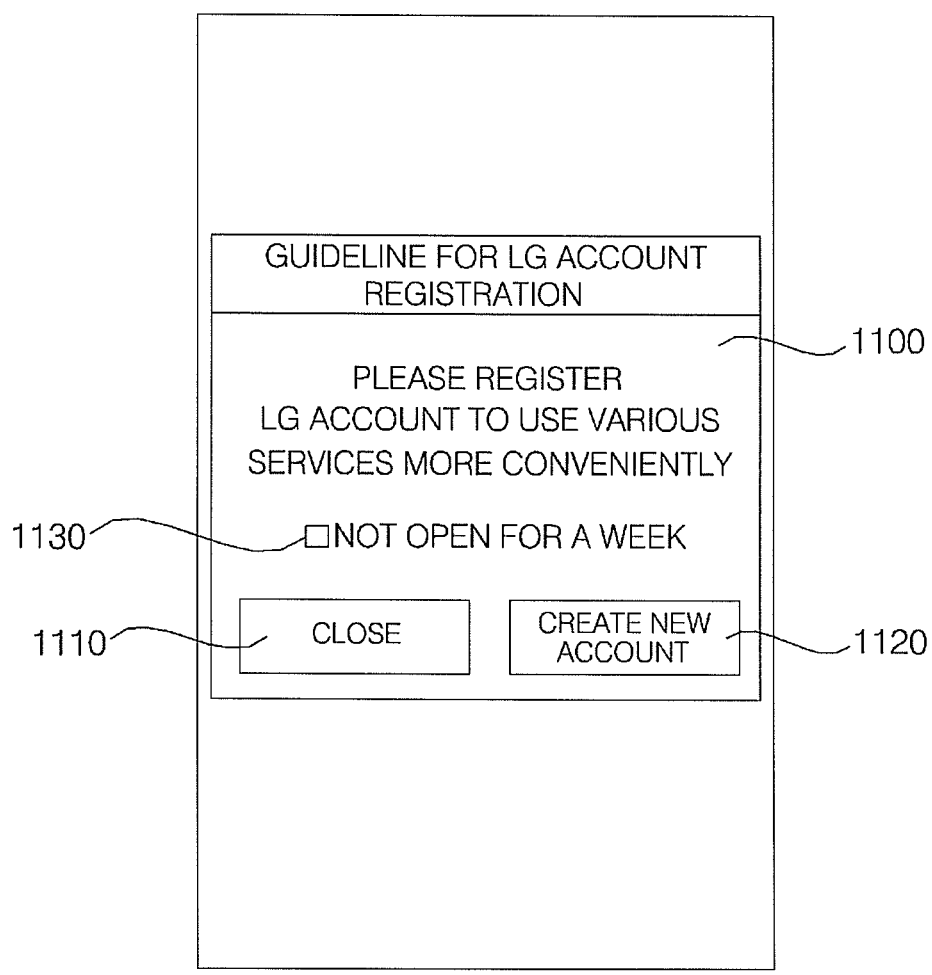

Referring to FIG. 11, in the example where a simple login operation is performed as the simple login item 720 is selected, the controller 480 may display a pop-up 1100 that guides registration of a user account.

The pop-up 1100 may include a close item 1110 to close the pop-up 1100, and a new account creation item 1120 to create a new user account.

A user may select the close item 1110 to use a simple login service, or may select the new account creation item 1120 to create a user account. The new account creation item 1120 may be an account switching button.

When the user selects the close item 1110, the application home screens 910 and 920 are displayed on the display 451, and when the user selects the new account creation item 1120, the screen is switched (or changed) to a screen for creating an account.

Once the account switching button 1120 in the pop-up 1110 is selected, the controller 480 displays a message indicating account switching, and performs switching to an account login screen. When a user has no user account, the screen for the account login may be the screen for creating a new account.

The pop-up 1100 may further include an item 1130 for not displaying the pop-up 1000 for a predetermined period of time.

Figure 12:
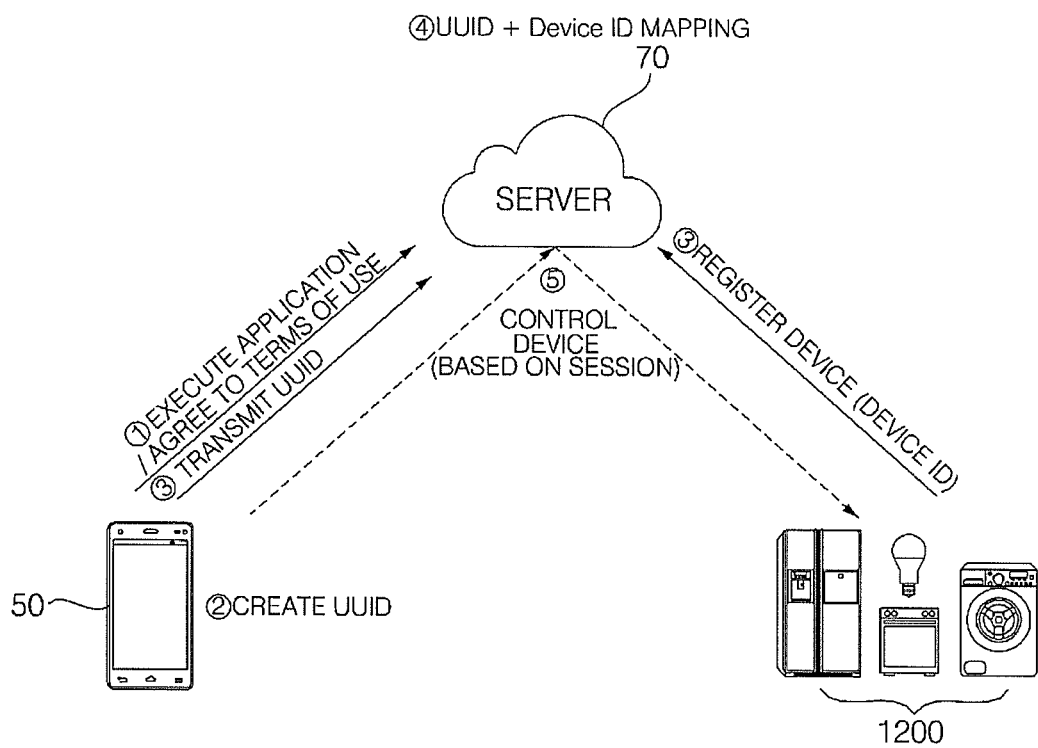
Figure 14:
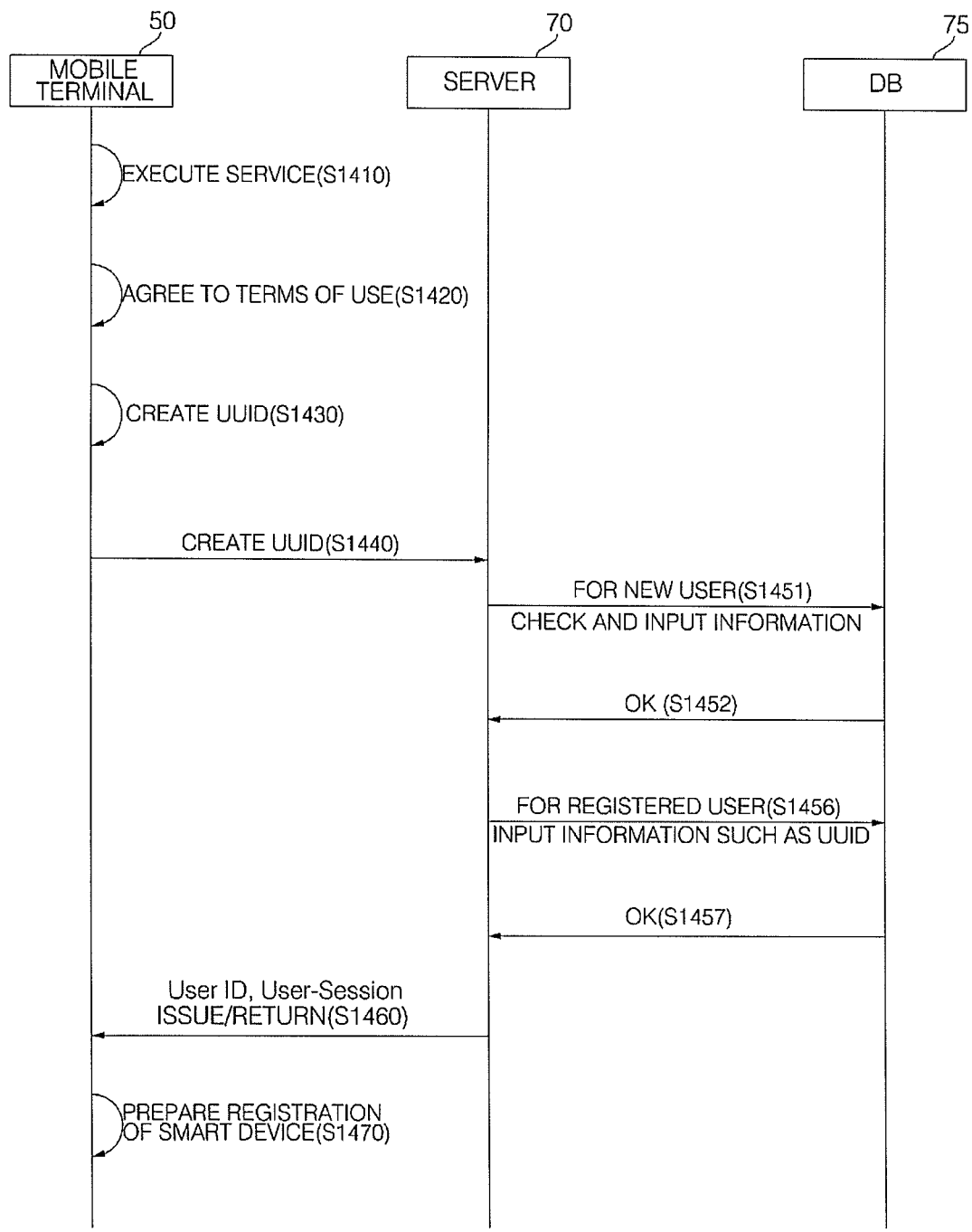

FIGS. 12 to 14 are diagrams referred to in the description of a simple login according to an example embodiment of the present disclosure. Other embodiments and configurations may also be provided.

FIG. 12 is a structure diagram illustrating use of service based on a simple login ID (UUID).

Referring to FIG. 12, a user may execute an application on the mobile terminal 50, and may agree to the terms of use for a simple login service.

Accordingly, by using device information of the mobile terminal 50, the controller 480 may create the simple login ID (UUID), which is a unique identifier generated (or provided) by selecting a random string of characters.

The controller 480 may transmit the created simple login ID (UUID) to the server 70, and the server 70 may use the simple login ID (UUID) as it is, or may create a new account corresponding to the simple login ID (UUID).

The server 70 may manage mapping of the simple login ID (UUID) to an identifier of the registered IoT device and the home appliance 1200.

Moreover, the server 70 may control the IoT device and the home appliance 1200 by using a session issued based on the simple login ID (UUID).

FIG. 13 illustrates a table in which a service using the simple login ID is compared with a service using a user account (LG account).

Referring to FIG. 13, a user of the simple login ID (UUID) is a user of an account automatically issued by a system based on device information of the mobile terminal 50, the user logging into a service without subscription of an account and login of an ID and password. Users of the simple login ID may be classified for each mobile terminal.

A User account member may create a user account by signing up for a membership and the like, the user logging into a service with the created user account. Users of the user account may be classified for each user account.

The simple login ID (UUID) and the user account may be the same level of accounts used for a service, and both accounts may be used for one service, but may not be used at the same time. That is, the simple login ID (UUID) and the user account may be used independently from each other.

Referring to FIG. 13, the simple login ID (UUID) may be used for a service of controlling a home appliance and the like without membership, in which personal information is not collected for the purpose of account creation, thereby easing concern about collection of personal information such as an email, name, date of birth, and the like.

The simple login ID (UUID) service has no membership account, such that there is no general login/logout process.

The simple login ID (UUID) service may be cancelled when a user opts out of the service, and the registered home appliance is disconnected.

FIG. 14 illustrates an example of creating a simple login ID (UUID).

Referring to FIG. 14, a user executes an application using the mobile terminal 50 in S1410, and agrees to the terms of use in S1420.

The controller 480 may create the simple login ID (UUID) based on device information of the mobile terminal 50 in S1430. The device information is at least one of the following: a manufacturer, a model name, and a serial number of the mobile terminal 50.

The mobile terminal 50 may transmit the created simple login ID (UUID) to the server 70 in S1440.

In the example of a new user, the server 70 may check and input information in a database 75 that is provided inside or outside of the server 70 in S1451, and the database 75 may response to the check and input operation in S1452.

Alternatively, in the example of a registered user, the server 70 may input information into the database 75 that is provided inside or outside of the server 70 in S1456, and the database may response to the input operation in S1457.

In the example of a new user, information is input into the database 75, and based on the input information, if there is previously input information, the previously input information is deleted, and then information for the new user is generated again to issue a user ID and user session, thereby preparing an application for use.

In the example of a registered user, if the user is registered in the database 75, it is recognized that the user is activated, and the user's ID and session are returned, thereby preparing an application for use in S1460.

The mobile terminal, to which a user session is issued, prepares for use of a home application service, such as registration of a home appliance and the like, in S1470 and may display an execution screen of the application on the display 451.

FIGS. 15 to 25 are diagrams referred to in the description of a method of operating a mobile terminal and a server according to an example embodiment of the present disclosure. Other embodiments and configurations may also be provided.

According to an exemplary embodiment, a user may switch (or change) a simple login ID to a general user account at a desired time, and may integrate or manage services used before the account switching (or account changing) or stored data.

For example, the user may switch an account by selecting an account switching button in the pop-up shown in FIG. 11 or by selecting an account switching button included in the setting screen.

Once the user selects the account switching button in the pop-up or the account switching button included in the setting screen, the controller 480 may display a message indicating the account switching, and may control switching to a screen for the account login.

Figure 15:
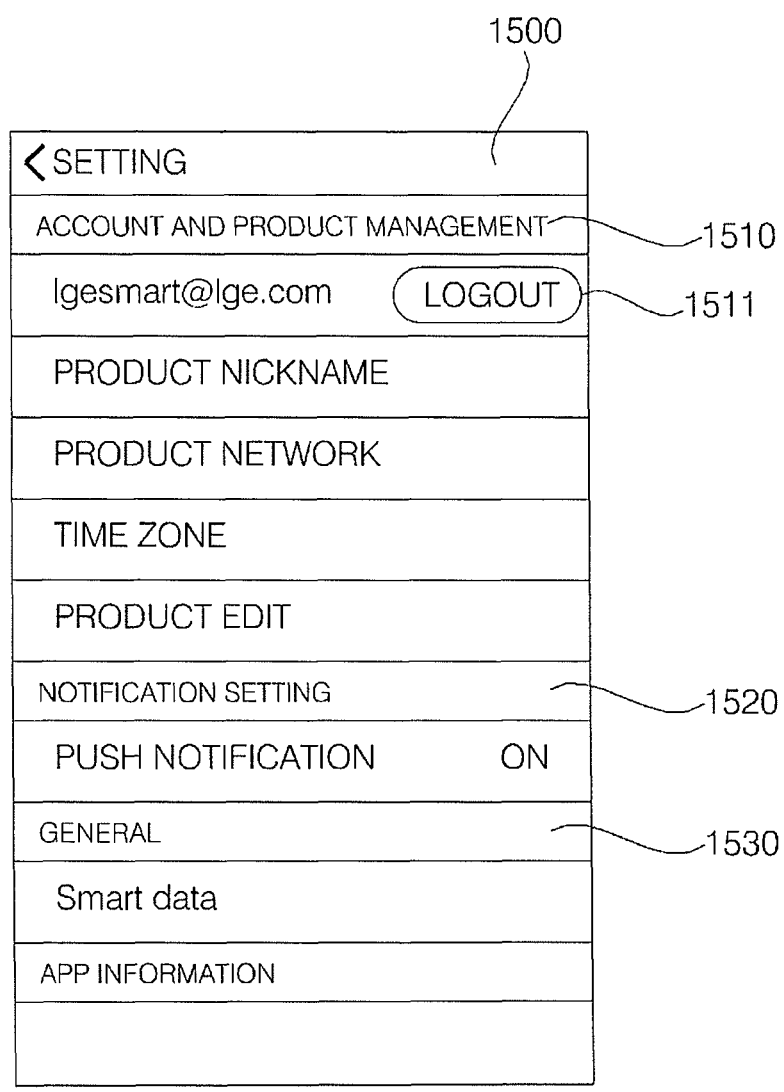
Figure 16:
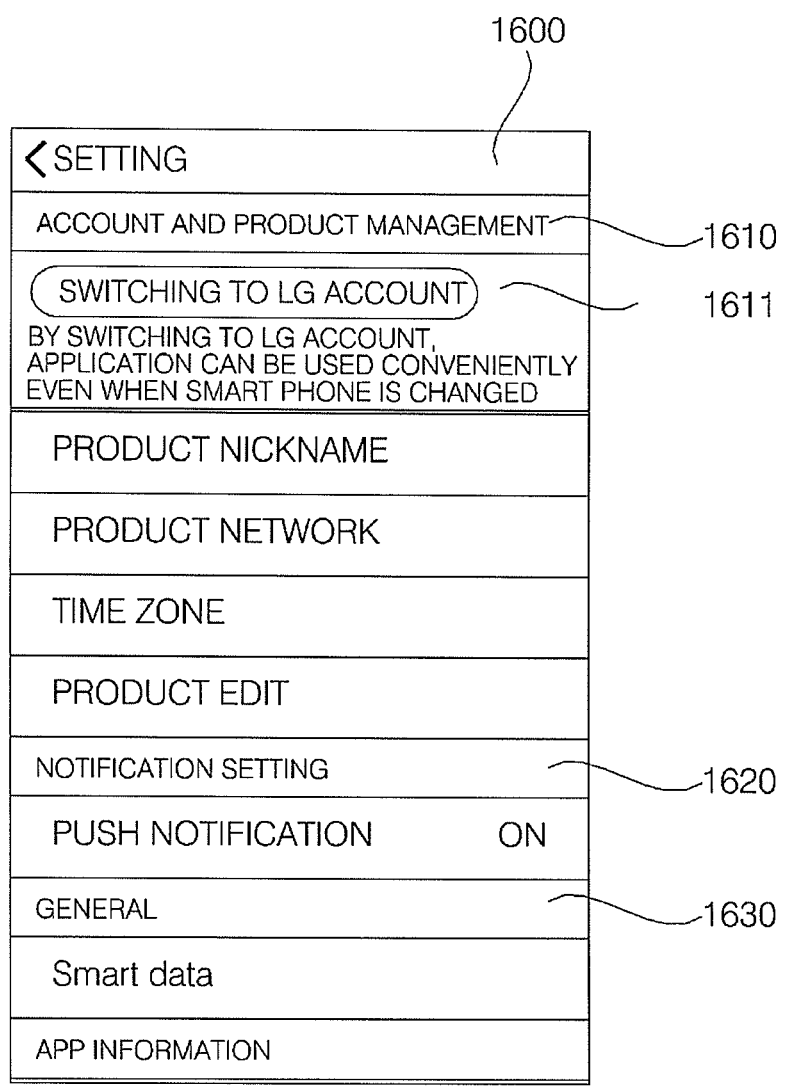

FIGS. 15 and 16 are diagrams illustrating setting screens. FIG. 15 illustrates a setting screen for a general user account login, and FIG. 16 is a setting screen for a simple login.

Referring to FIGS. 15 and 16, the setting screens 1500 and 1600 may include: account and product management regions 1510 and 1610, including menu items for setting a product nickname, a product network, a product time zone, and product edit; notification information setting regions 1520 and 1620 including a menu item for setting a notification function; and general regions 1530 and 1630 including a menu item for other general settings.

In the setting screen 1500 displayed for the general user account login, the account and product management region 1510 may include account information including an ID and a logout button 1511.

In some embodiments, the account information may only include the logout button 1511 without the ID/e-mail information.

Once a user selects the logout button 1511, the controller 480 may provide a pop-up to confirm the logout. After the logout, the controller 480 may control switching to a welcome screen.

The account and product management regions 1510 and 1610 may include at least one or more of the following: a product nickname item in the case where there are registered products; a product network item in the case where there is a product model, among the registered products, that supports setting of a product network; a time zone item in the case where there is a product which requires setting of a time zone among the registered products; and a product edit item for editing products.

Once a user selects a menu item in either the setting screen 1500 or the setting screen 1600, a detail display screen of the selected menu item may be displayed, or an additional screen may be displayed as a pop-up.

For example, in the case where the product nickname item is selected, a screen may be switched to a nickname management screen; in the case where the product network item is selected, a screen may be switched to a registered product list screen; in the case where the time zone item is selected, a screen may be switched to a registered product list screen where the time zone may be changed; and in the case where the product edit item is selected, a screen may be switched to a screen for editing a registered product.

In the case where there is a product that supports a PUSH notification setting among the registered products, notification information setting regions 1520 and 1620 may include a PUSH notification setting item, and may display an ON/OFF state. Further, once a user selects a notification setting item, a screen may be switched to a detail notification setting screen.

The general regions 1530 and 1630 may include a smart data item, which is provided in the case where there is a product model that supports smart data.

In the setting screen 1600 displayed for the simple login, the account and product management region 1610 may include an account switching button 1611.

That is, the home screen, displayed after the simple login is performed, may be the same as the home screen displayed after the account login is performed, while the setting screen 1600 of the simple login may be different from the setting screen 1500 of the account login.

Once the account switching button 1611 is selected, the controller 480 may control display of a message indicating the account switching, and may control switching to a screen for the account login.

Figure 17:
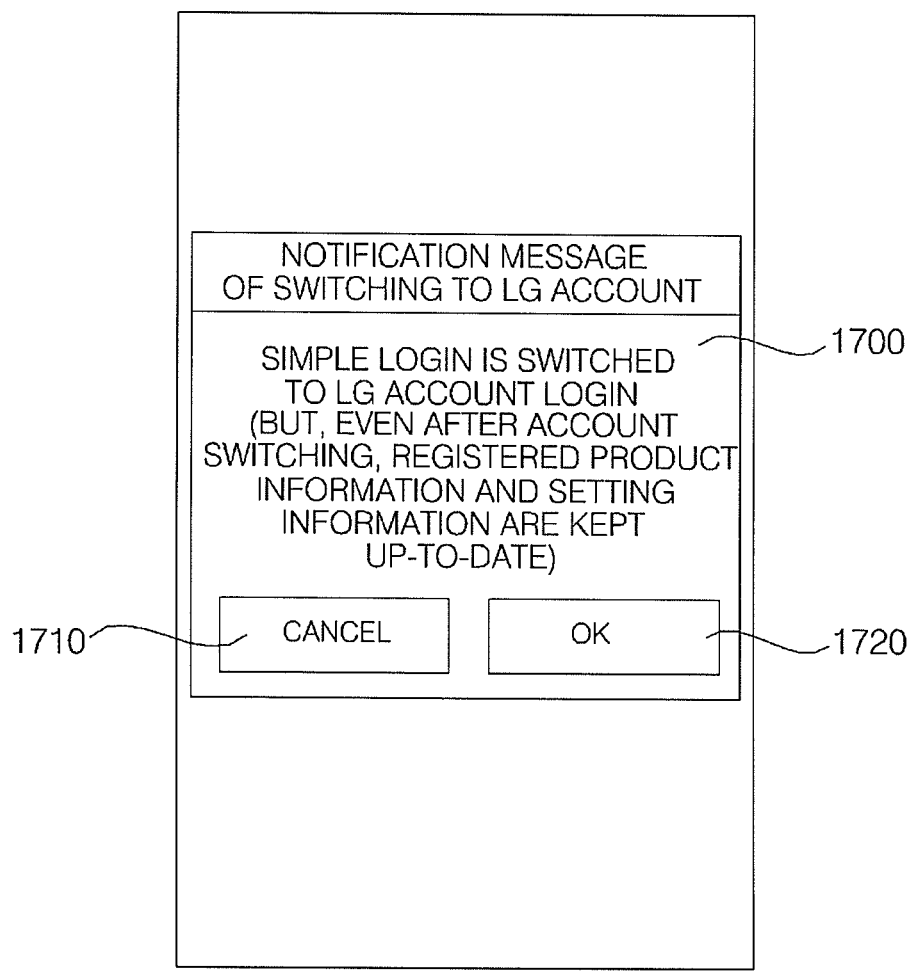

For example, the message indicating the account switching may be displayed in the form of an account switching notification pop-up 1700 as shown in FIG. 17.

The account switching notification pop-up 1700 may include an account switching notification message such as "simple login is switched to LG account login (But, even after the account switching process, registered product information and setting information are kept up-to-date)," and the like.

The account switching notification pop-up 1700 may include a cancel item 1710, by which the account switching may be canceled, and a confirm item 1720, by which the pop-up 1700 is closed to proceed to the account switching.

Once a user selects the confirm item 1720, the controller 480 terminates the simple login process, and performs switching to a login screen.

In some embodiments, the account switching notification pop-up 1700 may be closed after being displayed for a predetermined period of time without an item to be selected by a user, such as the confirm item 1720.

Account switching to a user account during the simple login service may be performed by integrating accounts after a new account is created, or by integrating into previously created user accounts.

When account switching is performed during the simple login service, lists of home appliances, which are linked to each account, are integrated.

During the account switching, the home appliances, which are linked to the simple login ID (UUID) and the user account, are integrated to allow for convenient use of home appliances, which have been previously used, without the need for re-registration.

FIG. 18 illustrates an example of integrating homes appliances linked to the simple login ID (UUID) and the user account, in which the simple login ID (UUID) is integrated into the user account, which is previously created and to which one home appliance is registered and linked.

Referring to FIG. 18, two home appliances are linked to the simple login ID (UUID), and one home appliance is linked to the user account. In this example, by integrating the simple login ID (UUID) into the user account, three home appliances may be linked to the integrated user account.

If no home appliance is linked to an existing user account, or a user account is newly created, only home appliances registered to the simple login ID (UUID) are linked to the integrated user account, and the home appliances are listed.

If no home appliance is linked to the simple login ID (UUID), only home appliances registered to the user account before integration are linked to the integrated user account, and the home appliances are listed.

During the account switching, a device usage history corresponding to the simple login ID (UUID) and the user account may be integrated and managed.

As a service is provided with the home appliances linked thereto, the device usage history may include an event occurrence record, regarding control, state change, error of devices and the like, which is accumulated based on the simple login ID (UUID) and the user account.

The device history information, accumulated through the simple login for each mobile terminal, may also be integrated into the integrated user account.

Additionally, when an account login is performed by using a predetermined user account or a newly created user account, setting information of an application associated with the home appliances may be applied to the integrated user account based on setting information corresponding to the simple login ID account.

Once the account login process is performed by using the predetermined user account or the newly created user account, the controller 480 (of the mobile terminal 50) may control the setting information of an application associated with the home appliances to be applied to the integrated user account based on the setting information corresponding to the simple login ID account.

Moreover, upon receiving, from the mobile terminal 50, an account switching request to switch the simple login ID account to the user account, and once the simple login ID account is switched to the predetermined user account or the newly created user account, the processor 510 (of the server 70) may control the setting information of an application associated with the home appliances to be applied to the integrated user account based on the setting information corresponding to the simple login ID account.

That is, the setting information applied to the simple login ID account, which has been created and managed based on device information of the mobile terminal 50, may be first applied to the integrated user account.

FIG. 19 illustrates an example of integrating user settings of the simple login ID and user account, and more specifically an example of integrating notification settings.

The user settings are values set by a service user for a device or service, in which only one setting is provided per user account.

During the account switching, setting information applied to a device (i.e., setting information applied to the simple login ID) may be first applied to the user account integrated by the account switching.

Referring to FIG. 19, it can be seen that regardless of a notification reception setting of a user account, a notification reception setting applied to the simple login ID (UUID) is applied to a notification reception setting of the user account integrated by the account switching.

In the case where account login is performed by using a predetermined user account, the controller 480 (of the mobile terminal 50) and/or the server 70 (of the processor 510) may integrate contents corresponding to the simple login and contents corresponding to the predetermined user account, and provide the integrated contents.

Among the contents corresponding to the simple login and the contents corresponding to the predetermined user account, fixed contents defined in a home appliance may be integrated without overlapping, and the integrated contents may be provided.

Among the contents corresponding to the simple login and the contents corresponding to the predetermined user account, contents directly generated or changed by a user may be integrated without being deleted, and the integrated contents may be provided.

In some embodiments, the controller 480 (of the mobile terminal 50) or processor 510 (of the server 70) may change a title of at least one of the contents having the same title.

In the case where a number of contents corresponding to the simple login ID account and a number of contents corresponding to the predetermined user account are greater than a maximum storage number, the controller 480 (of the mobile terminal 50) or processor 510 (of the server 70) may control most recently stored contents to be maintained within a range of the maximum storage number.

The service contents may be divided into product defined contents and user defined contents.

The product defined contents are fixed contents predefined by a product, and are provided to be selected and set by a user, in which the user may only select the contents from a list of the fixed contents, and a plurality of contents may be selected and set per user account.

For example, the product defined contents may be wash cycles of a washing machine, and may be bookmarked by a user.

The user defined contents are directly generated and stored by a user, and details of the contents are personal and variable. A plurality of contents may be selected and set per user account.

For example, the user defined contents may be oven recipes or a list of foods stored in the refrigerator, and may be directly generated and stored by a user, or may be generated based on sensing data of each device.

Referring to FIG. 20, during the account switching from the simple login ID account (UUID) to the user account (LG), the product defined contents stored for each account may be integrated without overlapping.

For example, when three wash cycles, including a general wash cycle, a blanket wash cycle, and a Y-shirt wash cycle, are bookmarked in the simple login ID (UUID) account, and two wash cycles, including a general wash cycle and a Y-shirt wash cycle, are bookmarked in the user account (LG), information to be maintained in the integrated user account after the account switching process is information on three wash cycles of a general wash cycle, a blanket wash cycle, and a Y-shirt wash cycle.

That is, product defined contents registered to both accounts are all maintained, while if product defined contents overlap, only one content is maintained.

Referring to FIG. 21, when the simple login ID account (UUID) is switched to the user account (LG), product defined contents stored for each account are integrated, such that a total number of the product defined contents may be greater than a number set as a maximum storage number.

However, some of the contents may be deleted, since a number of contents, which is greater than the maximum storage number, may not be stored.

In this example, most recently selected contents are first stored while a maximum storage number allowed for each home appliance is maintained.

That is, when a number of contents corresponding to the simple login ID account and a number of contents corresponding to the predetermined user account are greater than the maximum storage number, most recently stored contents are maintained within a range of the maximum storage number.

For example, it is assumed that a maximum storage number of bookmarked wash cycles is 200, in which in the case where the simple login ID account has 100 bookmarked wash cycles, and the user account has 200 bookmarked wash cycles, only 200 most recently stored contents may be maintained, and the 200 contents do not overlap with each other.

Referring to FIG. 21, when the simple login ID account (UUID) is switched to the user account (LG), all the user defined contents stored in each account may be maintained and integrated. The user defined contents are contents directly generated by a user, such that even when contents have the same title, the contents are not considered to be overlapping contents having the same details.

For example, three oven recipes (including sea mustard soup, curry rice, and gimbap) are stored in the simple login ID account (UUID), and two oven recipes (including sea mustard soup and gimbap) are stored in the user account (LG), information to be maintained in the integrated user account after the account switching process is information on five oven recipes of sea mustard soup, curry rice, and gimbap, sea mustard soup, and gimbap. That is, all the user defined contents registered to both the accounts are maintained.

In some embodiments, however, a title of at least one content, among contents having the same title, may be changed.

Referring to FIG. 22, sea mustard soup and gimbap are overlapping contents, such that numbers such as 1 or 2, symbols, or names, may be added for identification purposes.

Figure 24:
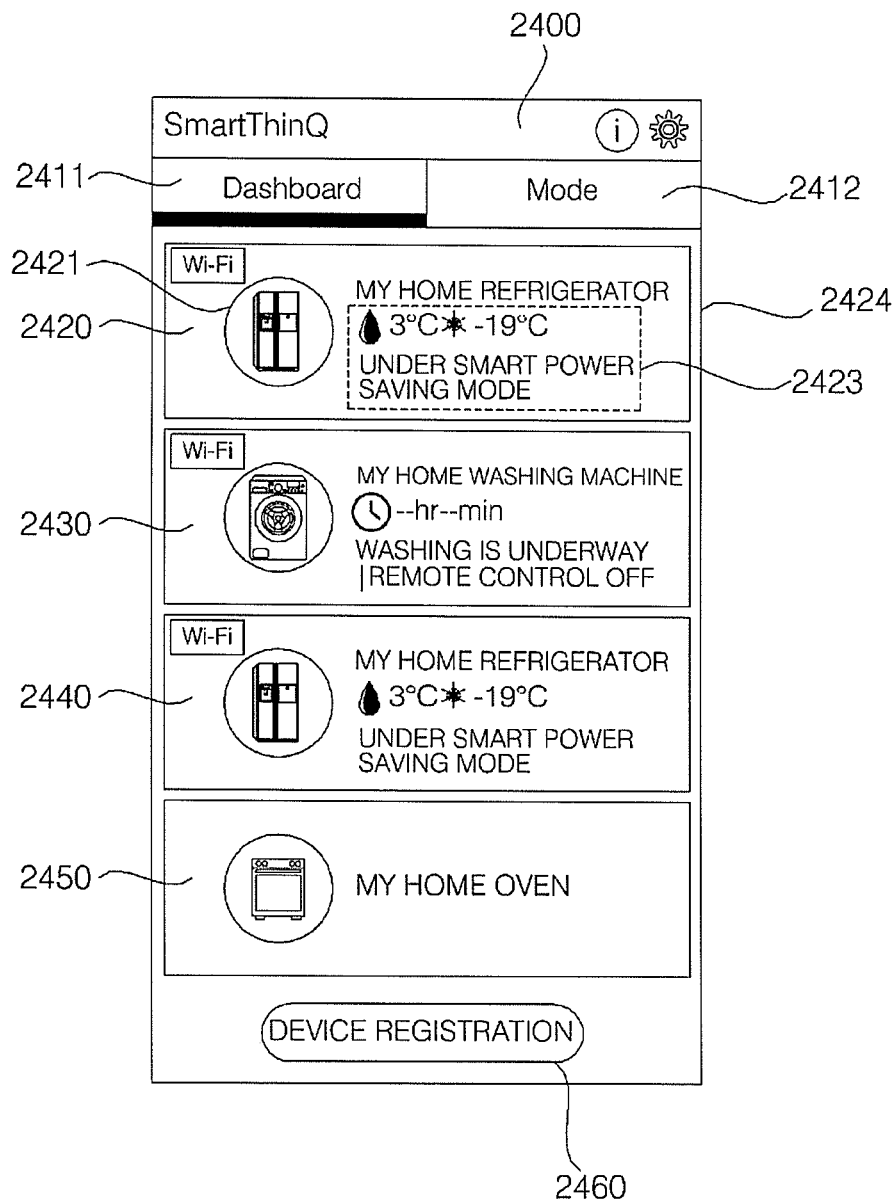

Referring to FIG. 24, when the simple login ID account (UUID) is switched to the user account (LG), the user defined contents stored for each account are integrated, such that a total number of the user defined contents may be greater than a number set as a maximum storage number.

Some of the contents may be deleted, since a number of contents, which is greater than the maximum storage number, may not be stored.

In this example, most recently selected contents are first stored while a maximum storage number allowed for each home appliance is maintained.

That is, in the case where a number of contents corresponding to the simple login ID account and a number of contents corresponding to the predetermined user account are greater than the maximum storage number, most recently stored contents are maintained within a range of the maximum storage number.

For example, it is assumed that a maximum storage number of oven recipes is 999, in which in the case where the simple login ID account has 500 oven recipes, and the user account has 600 oven recipes, only 999 most recently stored contents may be maintained.

Figure 25:
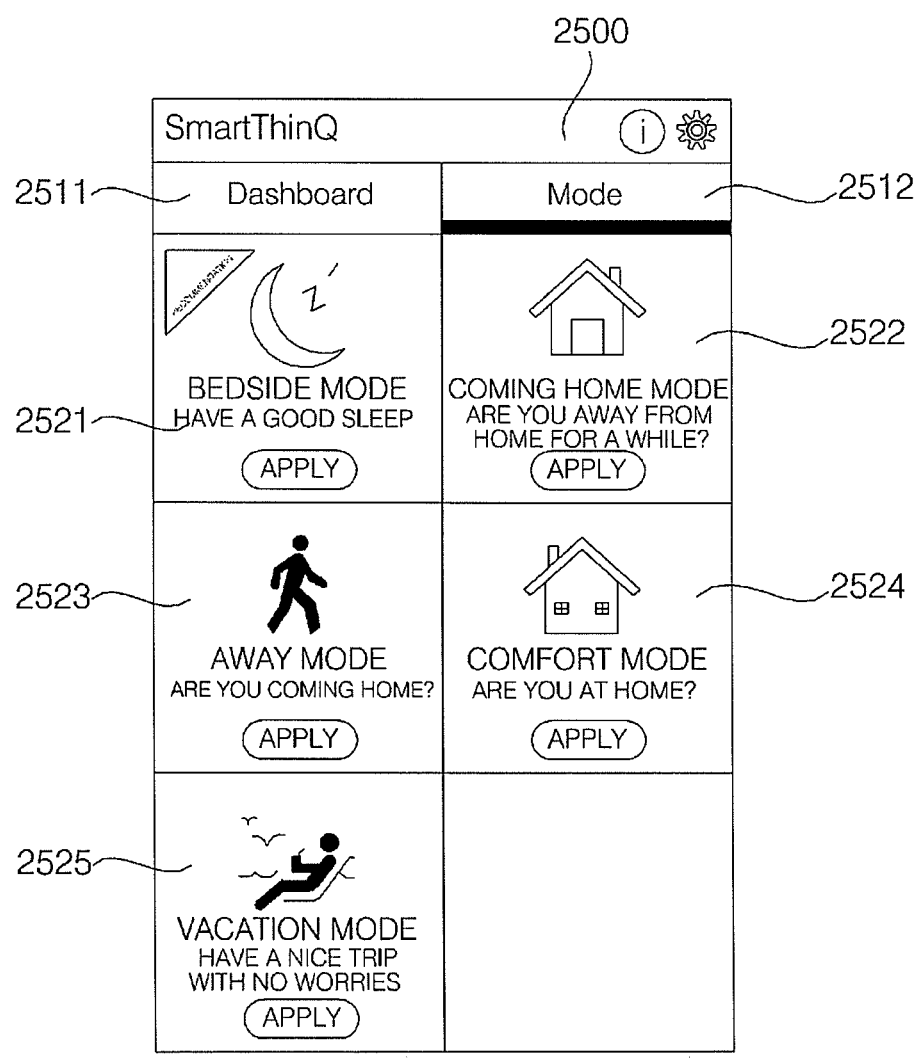

FIGS. 24 and 25 are diagrams illustrating an example of an application screen according to an example embodiment of the present disclosure. Other embodiments and configurations may also be provided.

Referring to FIGS. 24 and 25, the application screens 2400 and 2500 may include tab menu items 2411, 2412, 2511, and 2512, which are used to select between a dashboard screen including information on at least two or more devices, and a mode screen to select one mode from a plurality of modes.

The application screens 2400 and 2500 may display the dashboard screen or the mode screen in response to an item selected from the tab menu items 2411, 2412, 2511, and 2512.

FIG. 24 is a diagram illustrating an application screen, on which the tab menu items 2411 and 2511 are selected.

Referring to FIG. 24, the dashboard screen 2400 may include information on other types of devices. Other types of devices may be home appliance items, IoT device items, and gateway items.

The dashboard screen 2400 may include home appliance items and the gateway items.

The home appliance items 2420, 2430, 2440, and 2450 may include a name and a current state of a device, a mode applied to the device, and the like.

By taking a closer look at the home appliance item by using the refrigerator home appliance item 2420, it can be seen that the refrigerator home appliance item 2420 may include an icon representative of a refrigerator, and may further include a WiFi icon if the refrigerator has a WiFi module.

Additionally, the refrigerator home appliance item 2420 may include a nickname registered at the time of registration of a device, state information of each product and their setting values, icons representative of set modes, and the like.

Other home appliance items 2430, 2440, and 2450 may also include similar texts and graphic information to the refrigerator home appliance item 2420.

Once a user selects one of the home appliance items 2420, 2430, 2440, and 2450, a detail home appliance screen is displayed corresponding to the selected home appliance.

When there is no particular setting by a user, a default setting may be set to display the dashboard screen as a first screen when an application is executed.

FIG. 25 is a diagram illustrating an application screen, on which the mode tab menu items 2412 and 2512 are selected.

Referring to FIG. 25, the mode screen 2500 may include a plurality of mode items 2521, 2522, 2523, 2524, and 2525, including a bedside mode 2521, a coming home mode 2522, an away mode 2523, a comfort mode 2524, and a vacation mode 2525.

A user may select any one mode item from the plurality of mode items 2521, 2522, 2523, 2524, and 2525 for detail setting.

For example, in response to the away mode 2523 being selected from the plurality of mode items 2521, 2522, 2523, 2524, and 2525, a screen is switched to a detail screen of the away mode 2523, and the detail screen of the away mode 2523 may include an apply menu and detail operation items for each device.

According to at least one embodiment, user convenience may be enhanced by providing an application service to control home appliances, and a simple login based on a device and an account login based on an account.

Additionally, according to at least one embodiment, the device-based simple login ID account may be readily switched to a general account, and information registered to the accounts may be easily switched and integrated.

According to at least one embodiment of the present disclosure, a service to allow for convenient use of a plurality of home appliances may be provided.

The operation methods of the mobile terminal and the server according to the present disclosure may be implemented as processor-readable code that can be written on a processor-readable recording medium included in the mobile terminal. The processor-readable recording medium may be any type of recording device in which data is stored in a processor-readable manner. Examples of the processor-readable recording medium include a Read-Only Memory (ROM), a Random-Access Memory (RAM), a Compact Disk Read Only Memory (CD-ROM), a magnetic tape, a floppy disk, an optical data storage device, etc. Additionally, the processor-readable recording medium may be a carrier wave, e.g., data transmission over the Internet. In addition, the processor-readable recording medium can be distributed over a plurality of computer systems connected to a network such that processor-readable code is written thereto and executed therefrom in a distribution manner.

It is an aspect of the present disclosure to provide a mobile terminal, a server, and a method of operating the same, which may enhance user convenience by providing an application service to control home appliances, and a simple login based on a device and an account login based on an account.

It is another aspect of the present disclosure to provide a method to enable simple switching from a device-based simple login ID account to a general account, and to allow for easy switching and integration of information registered to the account.

It is yet another aspect of the present disclosure to provide a service to allow for convenient use of a plurality of home appliances.

In accordance with one aspect, in order to accomplish the above and other objects, there is provided a mobile terminal including: a display; a radio communication unit configured to exchange data with a server; and a controller configured to, in response to an input to execute an application associated with a home appliance, control a screen of the application associated with the home appliance to be displayed on the display, in response to a simple login item on the screen of the application being selected, create a simple login ID account based on device information of the mobile terminal, and control the radio communication unit to transmit data including information on the created simple login ID account to the server, and in response to an account login item on the screen of the application being selected, control the radio communication unit to transmit data including user account information to the server. Accordingly, user convenience may be enhanced by providing an application to control home appliances, the simple login based on a device, and the account login based on an account.

In accordance with another aspect, in order to accomplish the above and other objects, there is provided a server including: a communication module configured to exchange data with a mobile terminal; a storage unit configured to store data to provide a service of an application associated with a home appliance; and a processor configured to control a login operation to be performed based on data, including simple login ID information received from the mobile terminal, or based on user account information, and control the communication module to transmit a control signal, which is received from the mobile terminal, and based on which the home appliance is controlled, to the home appliance to be controlled.

According to at least one embodiment, user convenience may be enhanced by providing an application service to control home appliances, and a simple login based on a device and an account login based on an account.

Additionally, according to at least one embodiment, the device-based simple login ID account may be readily switched to a general account, and information registered to the accounts may be easily switched and integrated.

According to at least one embodiment, a service to allow for convenient use of a plurality of home appliances may be provided.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display;
   a communication device configured to communicate with a server;
   a user input unit; and
   a controller configured to:
   create a simple login ID based on device information of the mobile terminal,
   control the communication device to transmit the simple login ID to the server for performing a simple login using the simple login ID,
   receive, through the user input unit, user account information associated with a user account for performing an account login, and
   when the account login is performed after the simple login is performed, control setting information corresponding to a simple login ID account generated by the simple login ID to be applied to setting information corresponding to the user account,
   wherein the simple login ID account corresponding to the simple login is different from the user account corresponding to the account login.

2. The mobile terminal according to claim 1, wherein the controller is configured to:
   control the display to display a screen of an application associated with a home appliance in response to an input for executing the application, and
   in response to an input, received through the user input unit, for selecting a simple login item on the screen of the application, create the simple login ID and transmit the simple login ID to the server.

3. The mobile terminal according to claim 2, wherein the controller is configured to:
   control the display to display an account login screen for receiving the user account information in response to an input, received through the user input unit, for selecting an account login item or an account switching item on the screen of the application, and
   control the communication device to transmit the user account information to the server when the user account information is received through the user input unit.

4. The mobile terminal according to claim 3, wherein the controller is configured to control the display to display a pop-up that guides user account registration when the simple login using the simple login ID is performed.

5. The mobile terminal according to claim 2, wherein the screen of the application includes tab menu items to select among a dashboard screen including information on at least two or more devices, and a mode screen to select one of a plurality of modes.

6. The mobile terminal according to claim 5, wherein in response to selecting of one item from the tab menu items, the dashboard screen or the mode screen is displayed as the screen of the application.

7. The mobile terminal according to claim 5, wherein the dashboard screen includes information and icons of types of devices.

8. The mobile terminal according to claim 1, wherein in response to performing the account login by using the user account, the controller is configured to control integration of contents corresponding to the simple login ID account and contents corresponding to the user account.

9. The mobile terminal according to claim 8, wherein of the contents corresponding to the simple login ID account and contents corresponding to the user account, specific contents defined in a home appliance are integrated without overlapping.

10. The mobile terminal according to claim 8, wherein of the contents corresponding to the simple login ID account and contents corresponding to the user account, contents directly generated or changed by a user are integrated without being deleted.

11. The mobile terminal according to claim 10, wherein of the contents having a same title, the controller is configured to change the title of at least one content.

12. The mobile terminal according to claim 8, wherein in response to a total number of contents corresponding to the simple login ID account and a total number of contents corresponding to the user account being greater than a maximum storage number, the controller is configured to control recently stored contents to be maintained within a range of the maximum storage number.

13. The mobile terminal according to claim 1, wherein a home screen in which the simple login using the simple login ID is performed is similar to a home screen in which the account login is performed, and a setting screen of the simple login is different from a setting screen of the account login.

14. A server comprising:
a communication device configured to communicate with a mobile terminal; and
a processor configured to control a login operation to be performed based on data, and control the communication device to transmit a control signal to a home appliance to be controlled,
wherein the processor is further configured to:
control a simple login to be performed when a simple login ID is received from the mobile terminal;
control an account login to be performed when information associated with a user account is received from the mobile terminal; and
when the account login is performed after the simple login is performed, control setting information corresponding to a simple login ID account generated by the simple login ID to be applied to setting information corresponding to the user account,
wherein the simple login ID account corresponding to the simple login is different from the user account corresponding to the account login.

15. The server according to claim 14, wherein in response to an account switching being performed by using the user account, the processor is configured to control integration of contents corresponding to the simple login ID account and contents corresponding to the user account.

16. The server according to claim 15, wherein of the contents corresponding to the simple login ID account and contents corresponding to the user account, specific contents defined in the home appliance are integrated without overlapping.

17. The server according to claim 15, wherein of the contents corresponding to the simple login ID account and contents corresponding to the user account, contents directly generated or changed by a user are integrated without being deleted.

18. The server according to claim 17, wherein of the contents having a same title, the processor is configured to change the title of at least one content.

19. The server according to claim 16, wherein in response to a total number of contents corresponding to the simple login ID account and a total number of contents corresponding to the user account being greater than a maximum storage number, the processor controls recently stored contents to be maintained within a range of the maximum storage number.

20. A method of operating a mobile terminal, including:
creating a simple login ID based on device information of the mobile terminal;
transmitting, through a communication device of the mobile terminal, the simple login ID to a server for performing a simple login using the simple login ID;
receiving, through a user input unit of the mobile terminal, information associated with a user account for performing an account login; and
when the account login is performed after the simple login is performed, controlling setting information corresponding to a simple login ID account generated by the simple login ID to be applied to setting information corresponding to the user account,
wherein the simple login ID account corresponding to the simple login is different from the user account corresponding to the account login.

* * * * *